United States Patent
Gross et al.

(10) Patent No.: US 11,082,001 B2
(45) Date of Patent: Aug. 3, 2021

(54) SELF-BALLASTED HELIOSTAT WITH SUSPENDED MIRROR ASSEMBLY

(71) Applicant: Heliogen, Inc., Pasadena, CA (US)

(72) Inventors: William Gross, Pasadena, CA (US); Andrea Pedretti, Bellinzona (CH)

(73) Assignee: Heliogen, Inc., Pasadena, CA (US)

( * ) Notice: Subject to any disclaimer, the term of this patent is extended or adjusted under 35 U.S.C. 154(b) by 213 days.

(21) Appl. No.: 16/426,599

(22) Filed: May 30, 2019

(65) Prior Publication Data
US 2019/0372513 A1 Dec. 5, 2019

Related U.S. Application Data

(60) Provisional application No. 62/680,499, filed on Jun. 4, 2018, provisional application No. 62/691,489, filed on Jun. 28, 2018.

(51) Int. Cl.
| | |
|---|---|
| *H02S 20/32* | (2014.01) |
| *F24S 50/20* | (2018.01) |
| *H02S 40/22* | (2014.01) |
| *H02S 20/10* | (2014.01) |

(52) U.S. Cl.
CPC .............. *H02S 20/32* (2014.12); *F24S 50/20* (2018.05); *H02S 20/10* (2014.12); *H02S 40/22* (2014.12)

(58) Field of Classification Search
CPC combination set(s) only.
See application file for complete search history.

(56) References Cited

U.S. PATENT DOCUMENTS

| | | |
|---|---|---|
| 5,461,515 A | 10/1995 | Sorce |
| 6,046,399 A | 4/2000 | Kapner |
| 6,899,096 B2 | 5/2005 | Nakamura |
| (Continued) | | |

FOREIGN PATENT DOCUMENTS

| | | | |
|---|---|---|---|
| CN | 205505445 U | * 8/2016 | ................. F24J 2/21 |
| KR | 2010-0061271 A | 6/2010 | |

OTHER PUBLICATIONS

PCT International Search Report and Written Opinion, regarding International Application No. PCT/US2019/034694, dated Sep. 19, 2019, 13 pages.

*Primary Examiner* — David J Laux
*Assistant Examiner* — Nikhil P Mashruwala
(74) *Attorney, Agent, or Firm* — Knobbe, Martens, Olson & Bear LLP

(57) ABSTRACT

A heliostat for tracking the sun is disclosed. The heliostat comprises a frame (104) with legs (102); an optical assembly (120) configured to hang between the legs of the frame by means of a plurality of wires (130); and a plurality of actuators (520) configured to change the orientation of the optical assembly via the plurality of wires. The optical assembly may include a mirror (122) or photovoltaic panel that tracks the sun, and concrete backing (610). The optical assembly may further include a tracking controller (150) to energize the plurality of actuators, photovoltaic cell (252) configured to power the tracking controller and actuators, cleaning assembly (1710), and reservoir (770) for capturing rain water on the optical assembly. The optical assembly may further include a camera (254) for capturing images of the frame and determining the orientation of the optical assembly based on the images.

17 Claims, 20 Drawing Sheets

(56) References Cited

U.S. PATENT DOCUMENTS

| | | | |
|---|---|---|---|
| 7,905,227 B2* | 3/2011 | Luconi | F24S 25/617 |
| | | | 126/696 |
| 8,399,759 B2 | 3/2013 | Luo | |
| 9,322,574 B2 | 4/2016 | von Behrens | |
| 9,443,992 B2 | 9/2016 | Adler et al. | |
| 9,446,568 B2* | 9/2016 | Larson | E04D 5/12 |
| 2007/0272234 A1 | 11/2007 | Allen | |
| 2008/0041364 A1* | 2/2008 | Brock | F24F 5/0017 |
| | | | 126/621 |
| 2011/0000478 A1 | 1/2011 | Reznik | |
| 2012/0318325 A1 | 12/2012 | Liu | |
| 2013/0042856 A1 | 2/2013 | Switkes et al. | |
| 2013/0314812 A1* | 11/2013 | Tharisayi | F24S 20/67 |
| | | | 359/853 |
| 2014/0251315 A1 | 9/2014 | Patwardhan | |
| 2018/0076757 A1 | 3/2018 | Gross et al. | |
| 2019/0107598 A1 | 4/2019 | Plourde et al. | |

* cited by examiner

SELF-BALLASTED HELIOSTAT WITH SUSPENDED MIRROR ASSEMBLY

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57. This application claims the benefit of U.S. Provisional Patent Application Ser. No. 62/680,499 filed Jun. 4, 2018 and U.S. Provisional Patent Application Ser. No. 62/691,489 filed Jun. 28, 2018, which are hereby incorporated by reference herein in their entirety for all purposes.

TECHNICAL FIELD

The invention generally pertains to a heliostat device for capturing solar energy. In particular, the invention relates to a mirror or photovoltaic panel suspended from a tripod frame for tracking the sun for purposes of converting the sunlight to useable energy.

BACKGROUND

Conventional heliostats are prohibitively expensive to build and install. These conventional heliostats include mirrors or photovoltaic panels, which can experience extreme forces in windy conditions. To withstand the wind loading, conventional heliostats are generally constructed from structural steel and anchored into the ground with posts and concrete. Steel, however, is a relatively expensive building material, and the labor cost to drill and set posts is comparable to the price of the heliostat itself. There is therefore a need for a cost-effective heliostat design that is also self-ballasting and wind-resistant.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to a heliostat for tracking the sun. An example heliostat comprises a frame with a plurality of leg members; an optical assembly configured to hang from the frame between the leg members of the frame; a plurality of wires configured to connect the optical assembly to the frame; and a plurality of actuators configured to change the orientation of the optical assembly via the plurality of wires. The optical assembly optionally includes a mirror or photovoltaic panel that tracks the sun, and a heavy backing to provide mass, thereby making the heliostat self-ballasting.

In some embodiments, the optical assembly is suspended from the plurality of wires in proximity to the center of mass of the optical assembly. In other embodiments, the wires connect to the optical assembly at the edges and then to the actuators at the underside of the optical assembly. The orientation of the optical assembly is varied by changing the tension on the wires. By varying the tension, the plurality of actuators can rotate the optical assembly about a first horizontal axis and a second horizontal axis perpendicular to the first horizontal axis, thereby changing the pitch and roll angles of the optical assembly.

In some embodiments, the optical assembly optionally further includes a tracking controller to energize the plurality of actuators, a photovoltaic cell configured to power the tracking controller and plurality of actuators, and/or a cleaning assembly. The cleaning assembly may optionally include a wiper blade and a water pump to spray water collected by a reservoir for capturing rain water on the optical assembly.

In other embodiments, the optical assembly optionally includes a camera for capturing images of the frame, e.g., the underside of the top rails. The tracking controller may then determine the orientation of the optical assembly relative to the frame based on the images.

BRIEF DESCRIPTION OF THE DRAWINGS

The present invention is illustrated by way of example and not limitation in the figures of the accompanying drawings, and in which.

DETAILED DESCRIPTION

Figure 1:
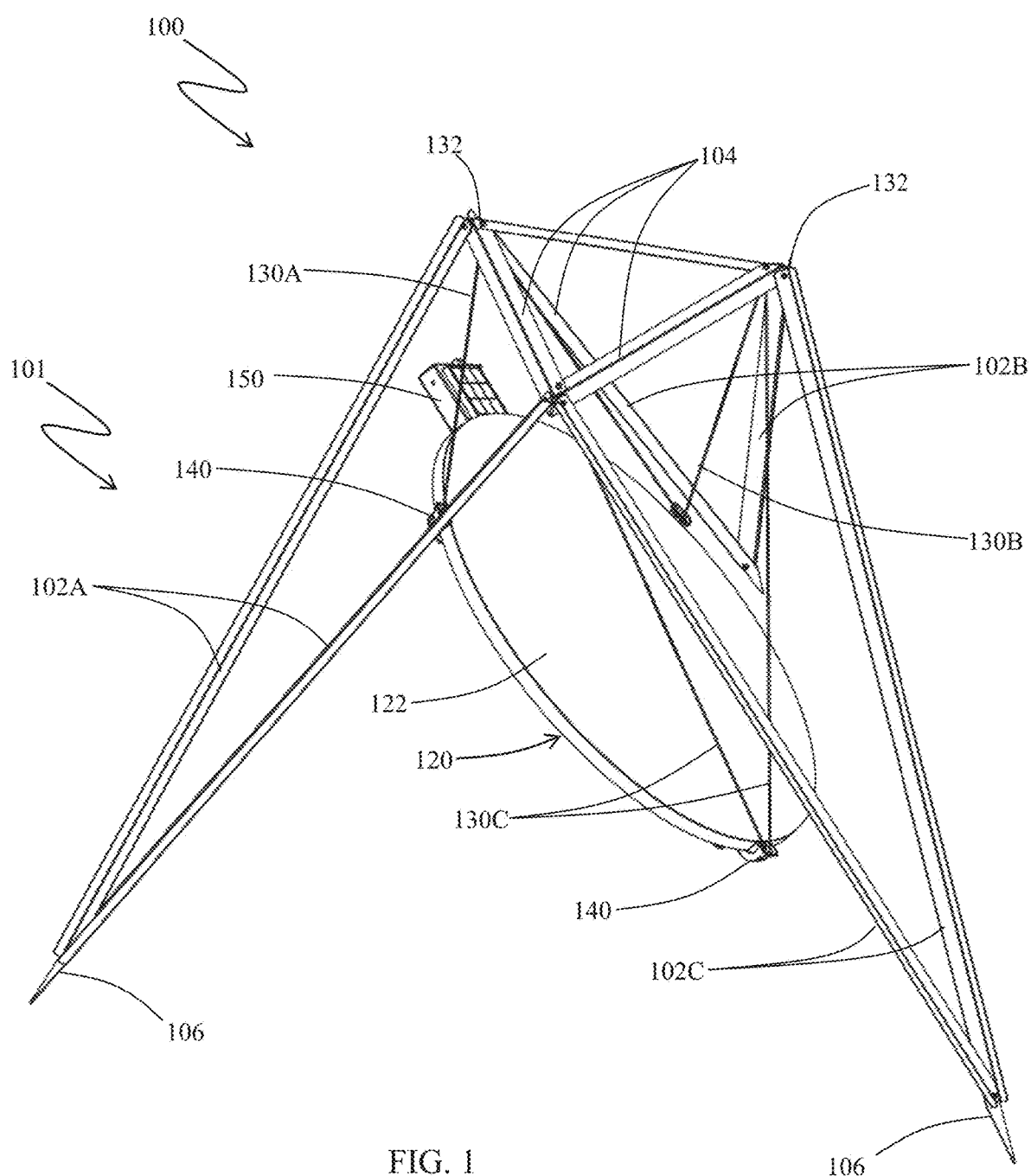
FIG. 1 is a perspective view of an example heliostat, in accordance with a first embodiment.

Illustrated in FIGS. 1 through 6 is a first embodiment of an example heliostat 100. The heliostat 100 includes a frame 101 with multiple legs, an optical assembly, and a plurality of wires or cables. The wires are configured to suspend the optical assembly from the frame, and are also configured to prevent the optical assembly from moving laterally. The optical assembly is able to pivot about a pitch axis and roll axis under the control of a plurality of actuators that determine the tension in the wires. In the preferred embodiment, the optical assembly includes a mirror for reflecting sunlight to a receiver tower, although the optical assembly in other embodiments may optionally include a photovoltaic (PV) panel.

The frame 101 includes a plurality of leg members 102A, 102B, 102C with footings 106, preferably in the form of a tripod. The heliostat is self-ballasting so each footpad 106 sits on the ground without any anchors, stakes, bolts, or foundation. The leg members 102A, 102B, 102C are also rigidly affixed to top rails 104 configured to form a triangle. The leg members and tops rails cooperate to provide stability while resisting movement, flexing, and torque.

The heliostat 100 includes a plurality of suspension wires 130A, 130B, 130C or other flexible members that suspend the mirror assembly 120 from the frame 101. The arrangement of wires is also configured to inhibit (e.g., prevent) the mirror assembly from moving laterally or in a swinging motion. In the example embodiment, the wires connecting the mirror assembly 120 to the frame 101 are arranged in diagonal patterns to inhibit (e.g., prevent) side-to-side motion of the mirror assembly.

In the first example embodiment, the wires 130A, 130B, 130C connect to the mirror at three points of contact at the edge of the mirror. For each contact point on the mirror, there are two wires, each connecting to a vertex 132 of the triangle formed by the top rails 104. In this embodiment, two wires 130A connect the left-most point of the mirror assembly to two vertices 132 where the legs 102A connect to a top rail 104. The two wires 130B connect the rear-most point of the mirror assembly to two vertices 132 where the legs 102B connect to a second top rail 104. The two wires 130C connect the right-most point of the mirror assembly to two vertices 132 where the legs 102C connect to a third top rail 104. The wires also extend under the optical assembly in the manner described below.

Figure 5:
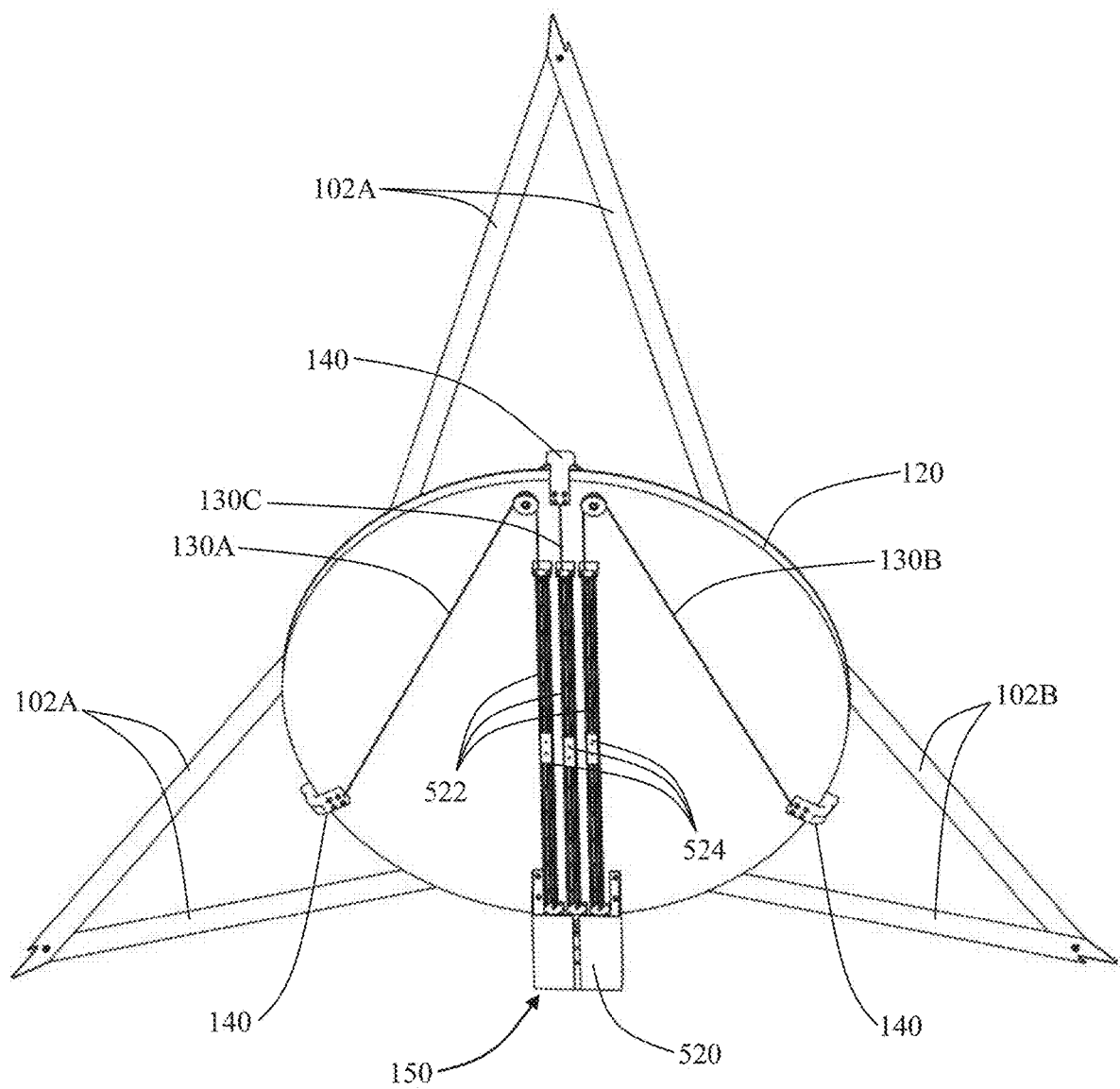
FIG. 5 is a bottom view of the heliostat, in accordance with the first embodiment.

At each of the three points of contact on the mirror 122, a wire guide 140 is mounted to the edge of the mirror assembly 120. Each wired guide is configured to capture two wires above the mirror assembly and redirect those wires in a manner parallel to the underside of the mirror assembly. The underside of the mirror assembly is illustrated in FIG. 5 and the wire guide 140 illustrated in FIG. 6. As discussed below, the orientation of the mirror 122 is altered by actuators that reel in or unreel the ends of the wires on the underside of the mirror assembly, thus raising or lowering, respectively, the sides of the mirror until the desired orientation is achieved.

Figure 2:
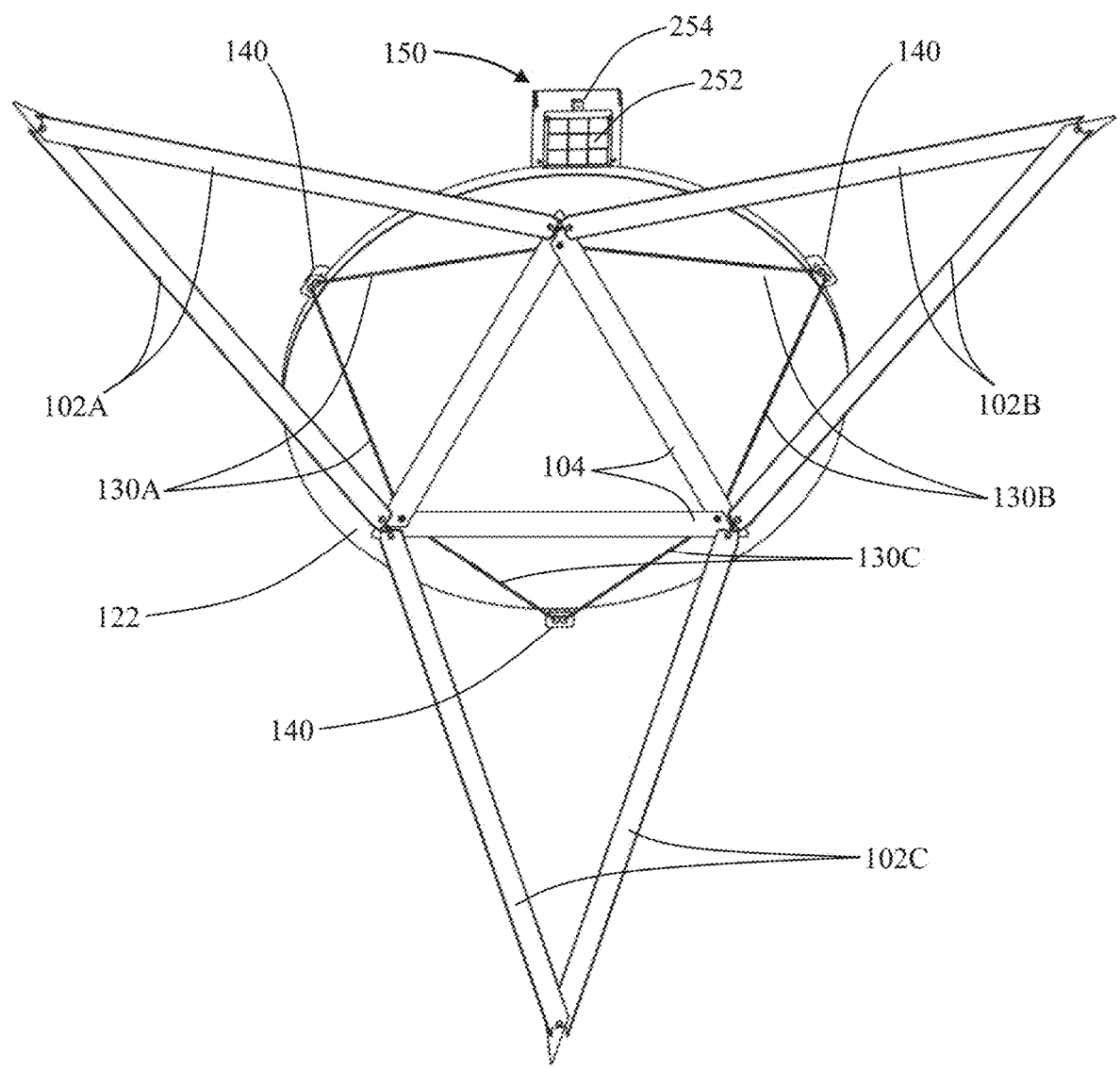
FIG. 2 is a top view of the heliostat, in accordance with the first embodiment.

As illustrated in the top view in FIG. 2, the heliostat 100 optionally further includes a self-powered tracking controller 150 and photovoltaic cell 252. Current from the PV cell 252 may optionally be used by the tracking controller to calculate the proper orientation of the mirror 122 and drive the actuators that physically move the mirror via the wires 130. The position of the mirror assembly 120 and/or sun may optionally be determined from images captured by a camera 254, which is also powered by the PV cell 252.

Figure 3:
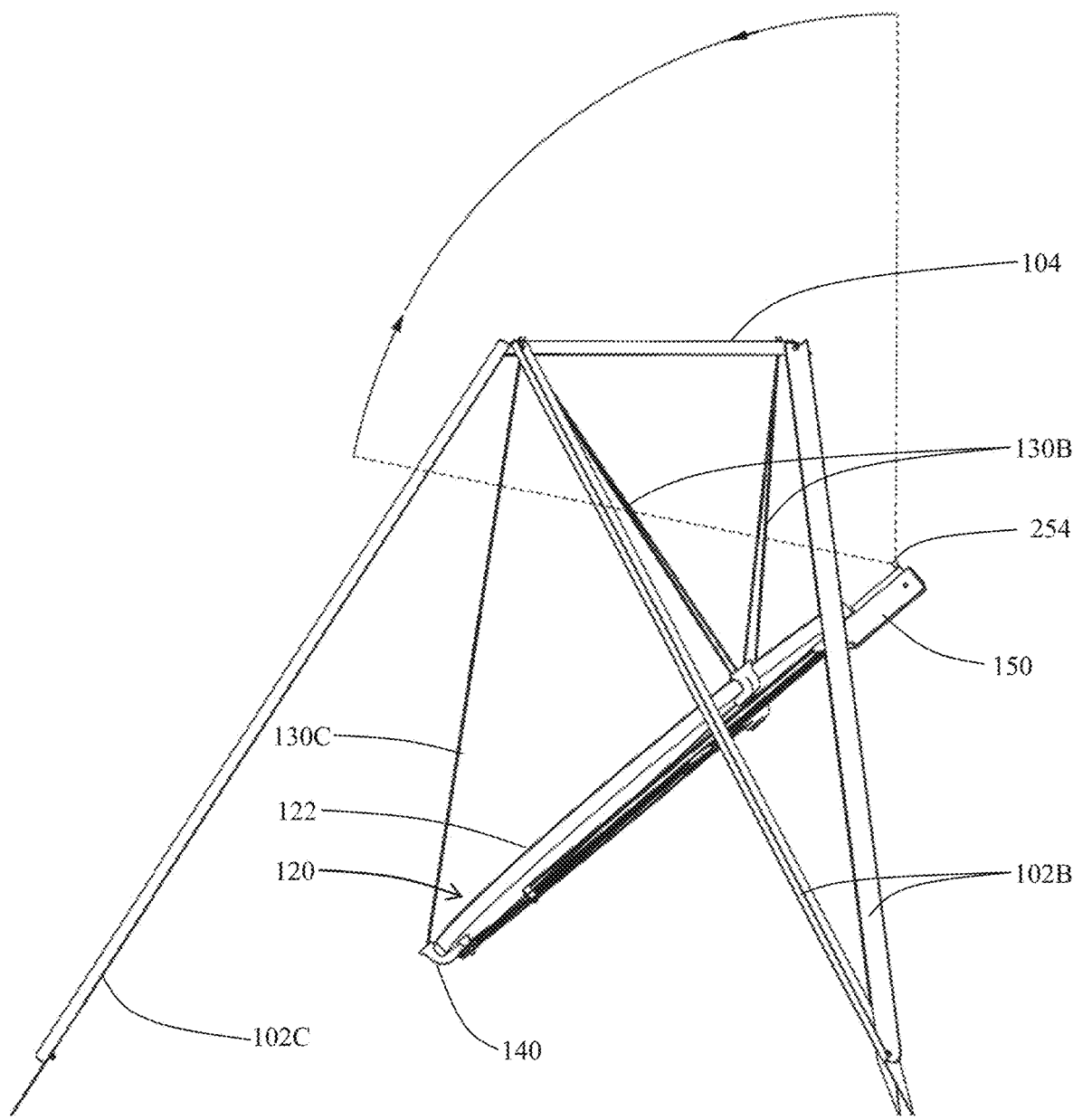
FIG. 3 is a side view of the heliostat, in accordance with the first embodiment.
Figure 4:
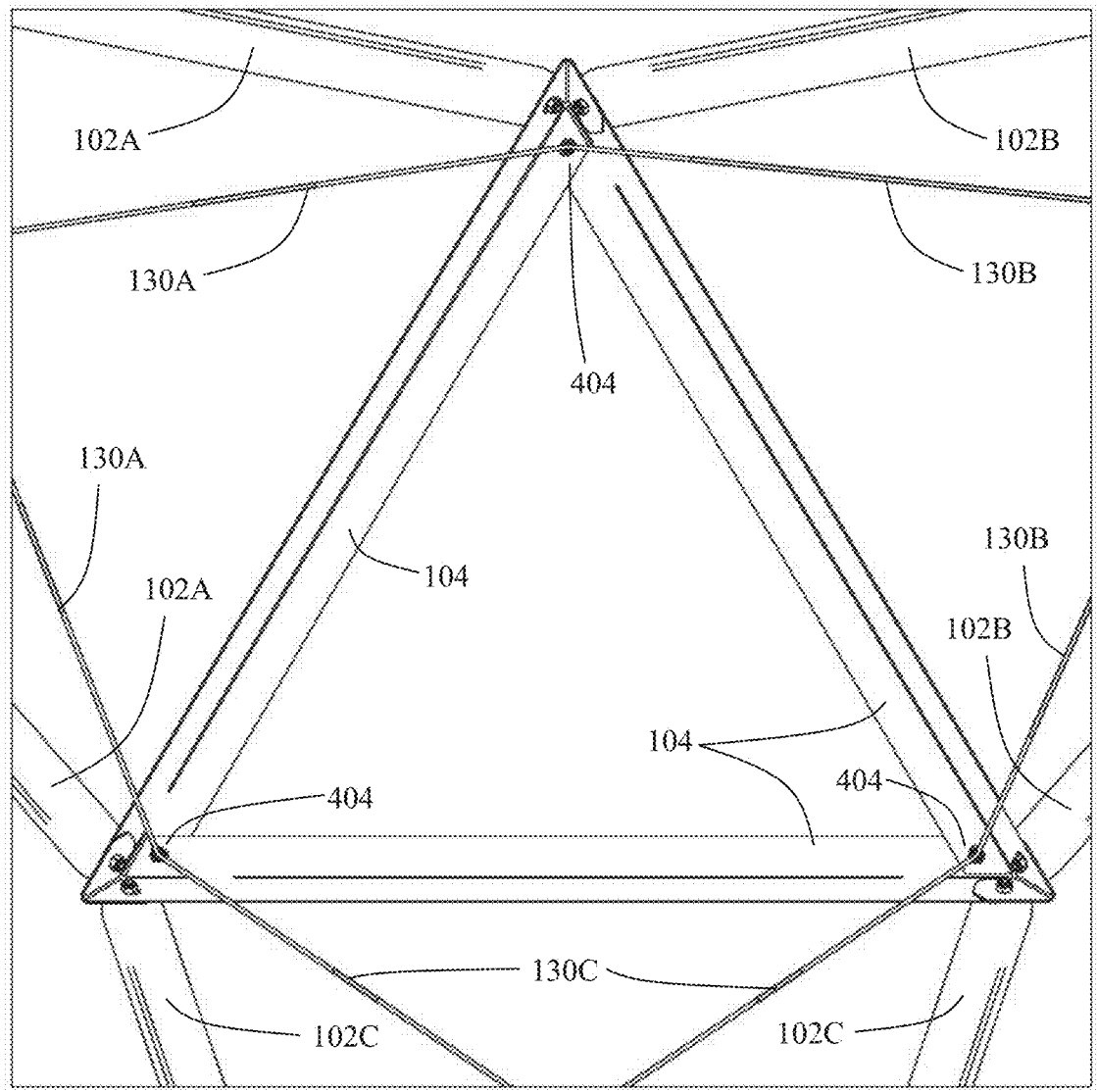
FIG. 4 is a camera view of the heliostat frame, in accordance with the first embodiment.

As illustrated in FIG. 3, the camera 254 integrated into the tracking controller 150 is optionally a pinhole camera oriented upward. The field of view of the camera 254 is large enough to see most if not all the top rails 104. An example image captured by the camera 254 is illustrated in FIG. 4. As can be seen in FIG. 4, the image clearly shows the top rails 104 and the wires 130A, 130B, 130C at fixed attachment points 404 where they connect to the vertices 132 of the top rails 104. Based on the camera images, the tracking controller can accurately determine the position and orientation of the mirror 122 with respect to the frame 101. Thereafter, the tracking controller can change the orientation of the mirror 122 to precisely reflect sunlight to a receiver of a solar power tower (not shown), for example.

Illustrated in FIG. 5 is the underside of the heliostat 100, including the underside of the mirror assembly 120. The mirror assembly 120 optionally includes a plurality of actuators 520 with at least three jack screws 522. Each jack screw 522 includes a carrier or square nut 524 that slides linearly within a guide (not shown) without turning in response to the rotation of a jack screw 522. Each square nut 524, in turn, is connected to the two wires 130A, 130B, 130C that run through a contact point, specifically a wire guide 140. To change the orientation of the mirror, the tracking controller 150 energizes one or more of the actuators 520, which turn one or more jack screws 522, which cause one or more square nuts 524 to slide toward or away from the actuators, which cause the ends of at least one pair of wires 130A, 130B, 130C to reel in or reel out. The wires 130A, 130B, 130C, which are free to slide through the wires guides 140, cause the associated edge of the mirror to lift or drop in an amount governed by the tracking controller 150. In general, the tracking controller 150 lifts one edge of the mirror 122 while lowering another edge of the mirror 122 to keep the center of gravity of the mirror 122 approximately fixed when changing the orientation of the mirror 122.

Figure 6:
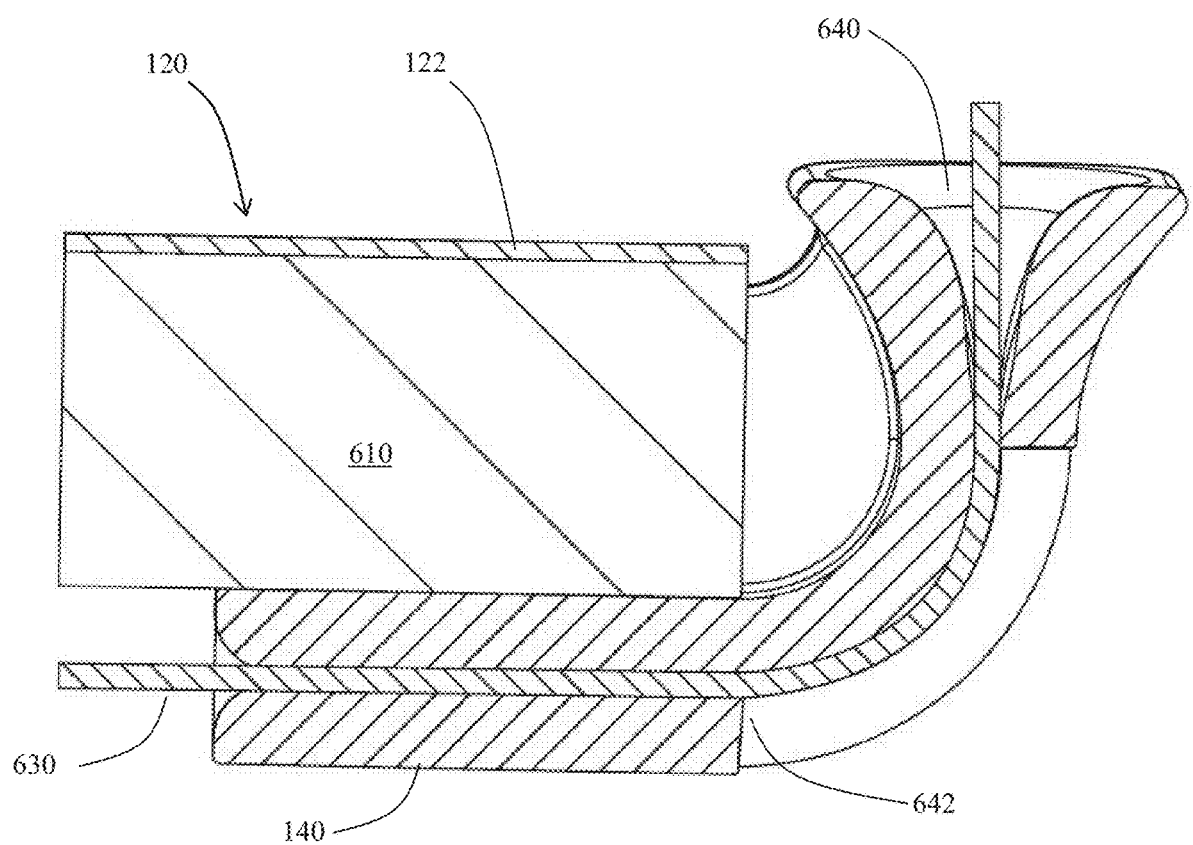
FIG. 6 is a cross section of an example wire guide, in accordance with the first embodiment.
Figure 7:
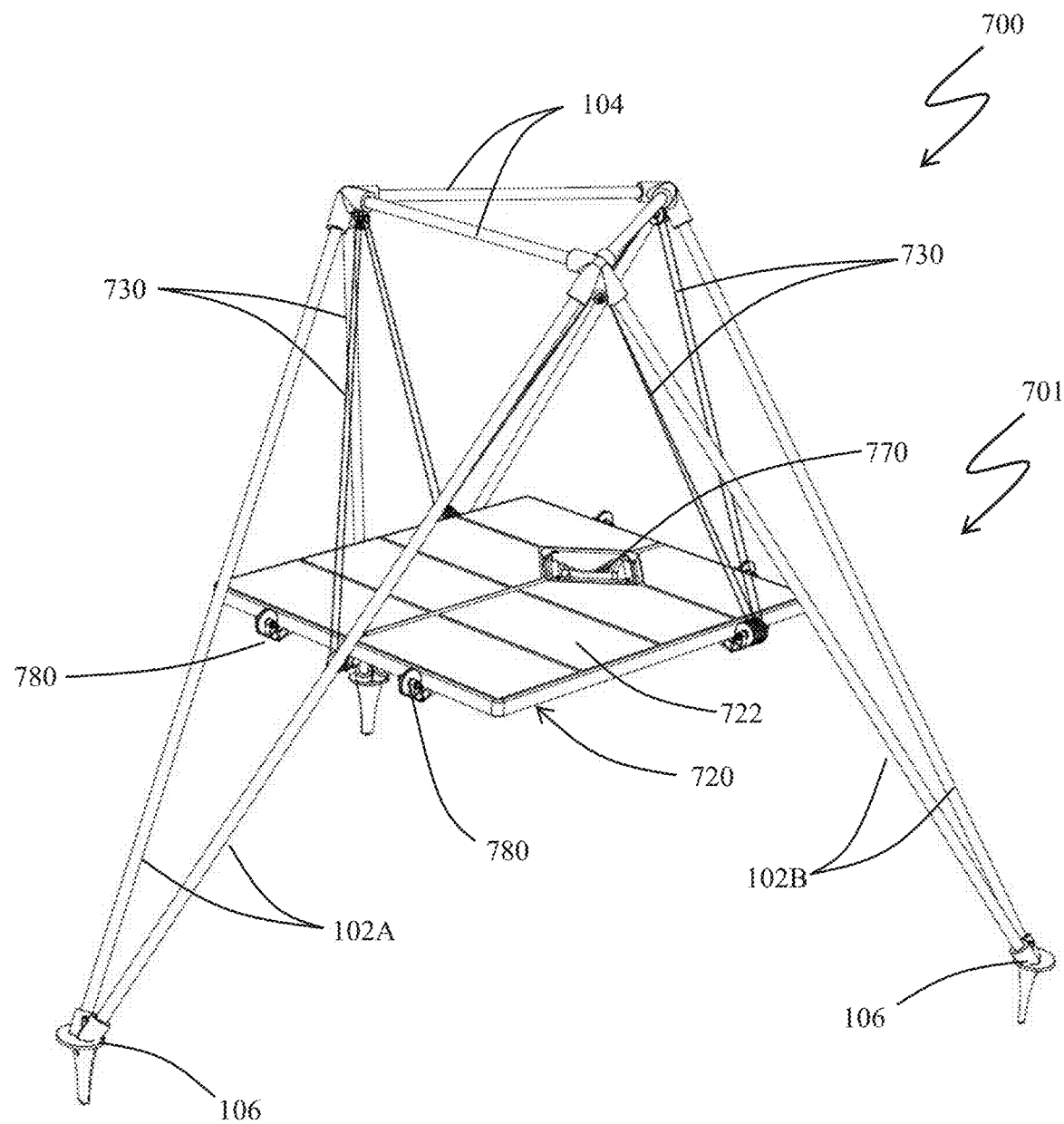
FIG. 7 is a perspective view of an example heliostat, in accordance with a second embodiment.
Figure 8:
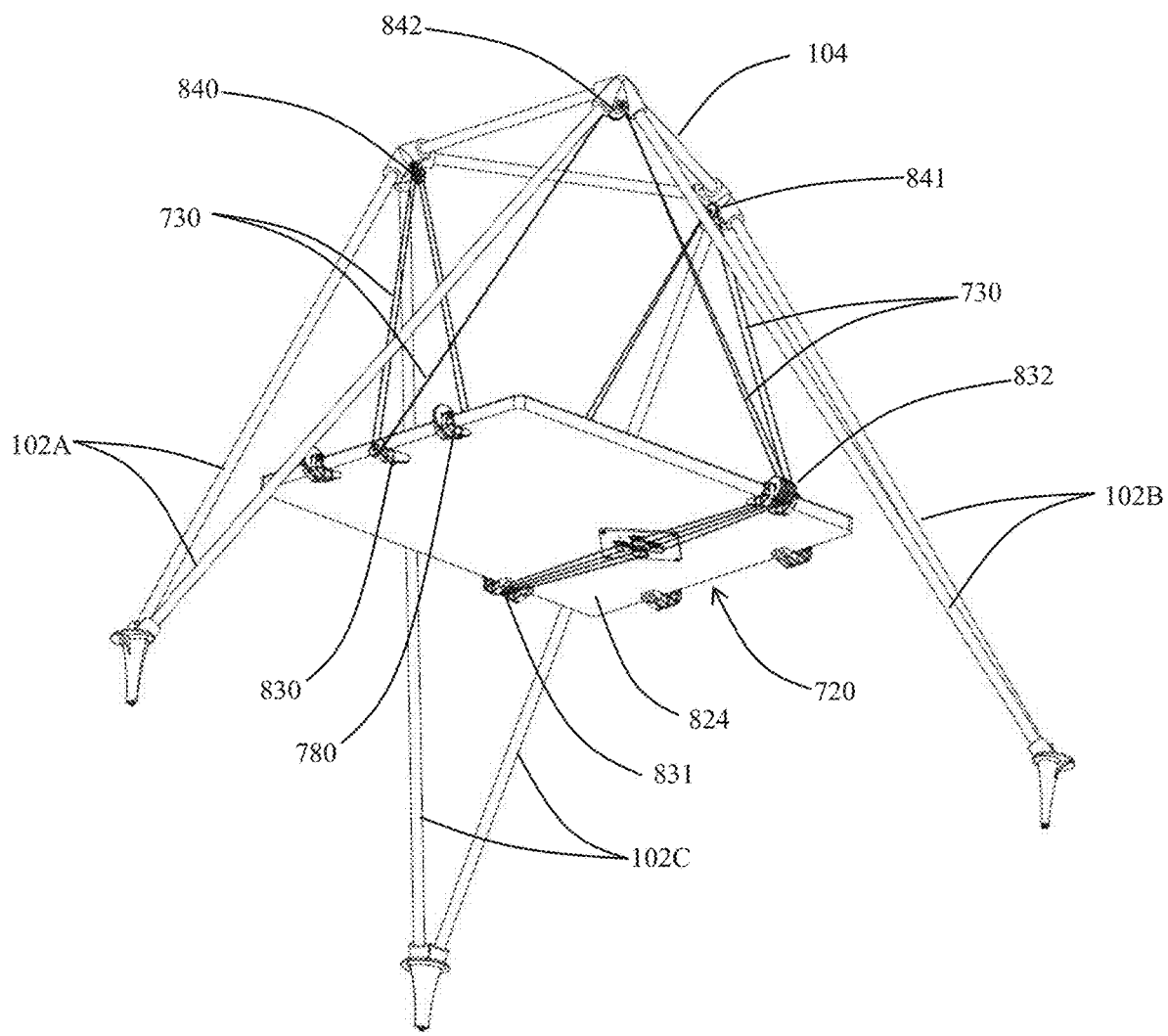
FIG. 8 is a perspective view of the heliostat, in accordance with the second embodiment.
Figure 9:
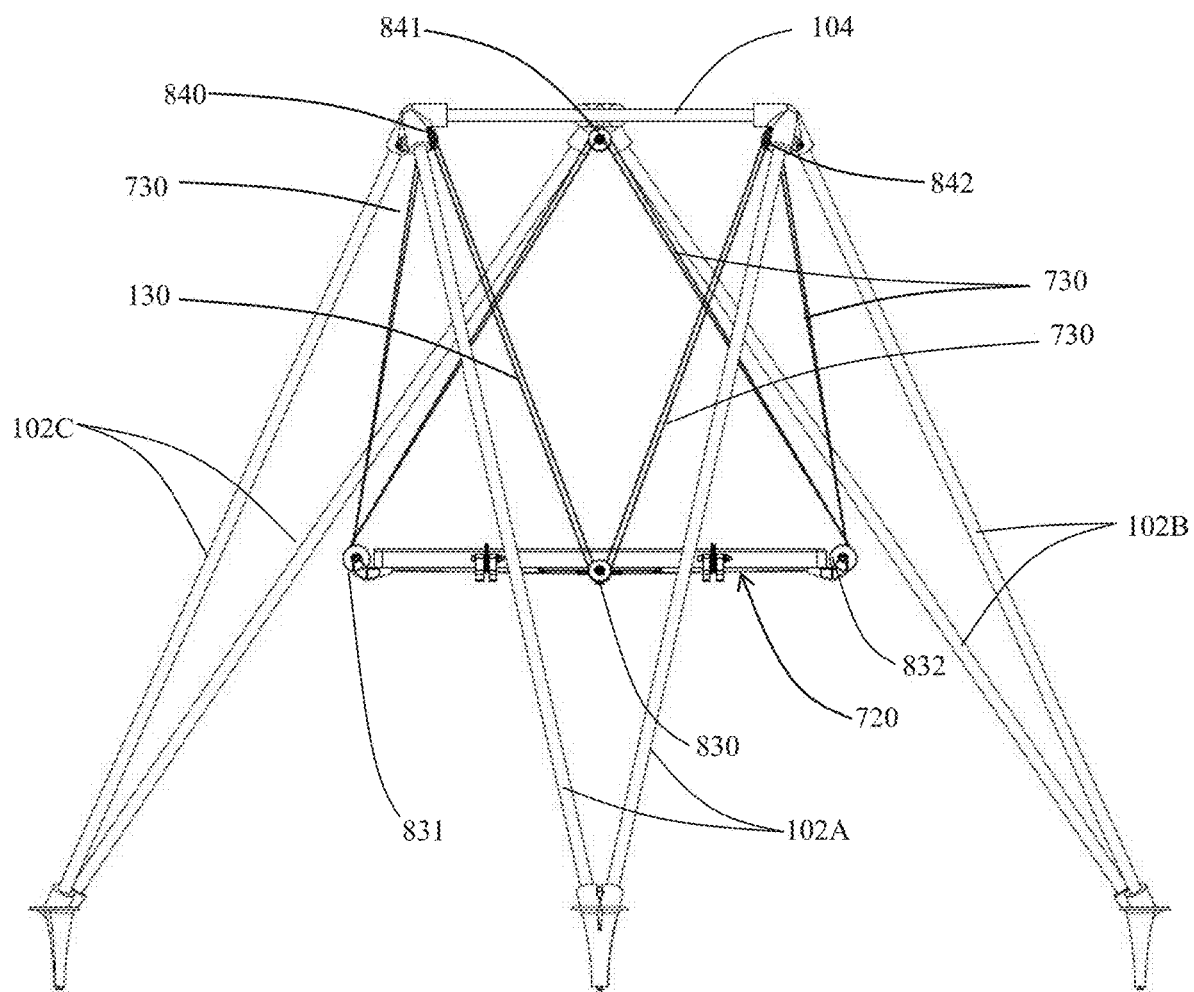
FIG. 9 is a front side view of the heliostat, in accordance with the second embodiment.
Figure 10:
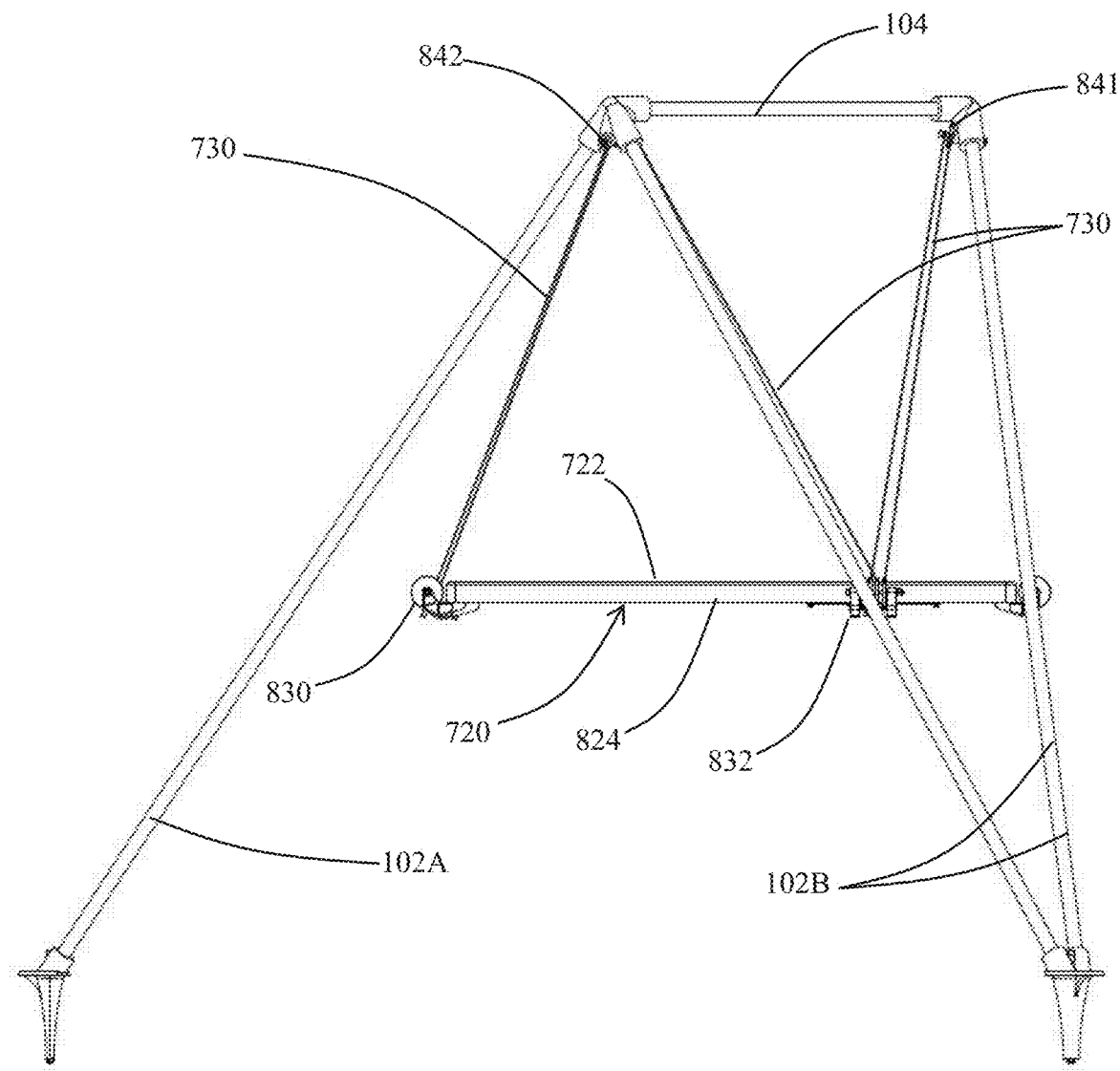
FIG. 10 is a right side view of the heliostat, in accordance with the second embodiment.
Figure 11:
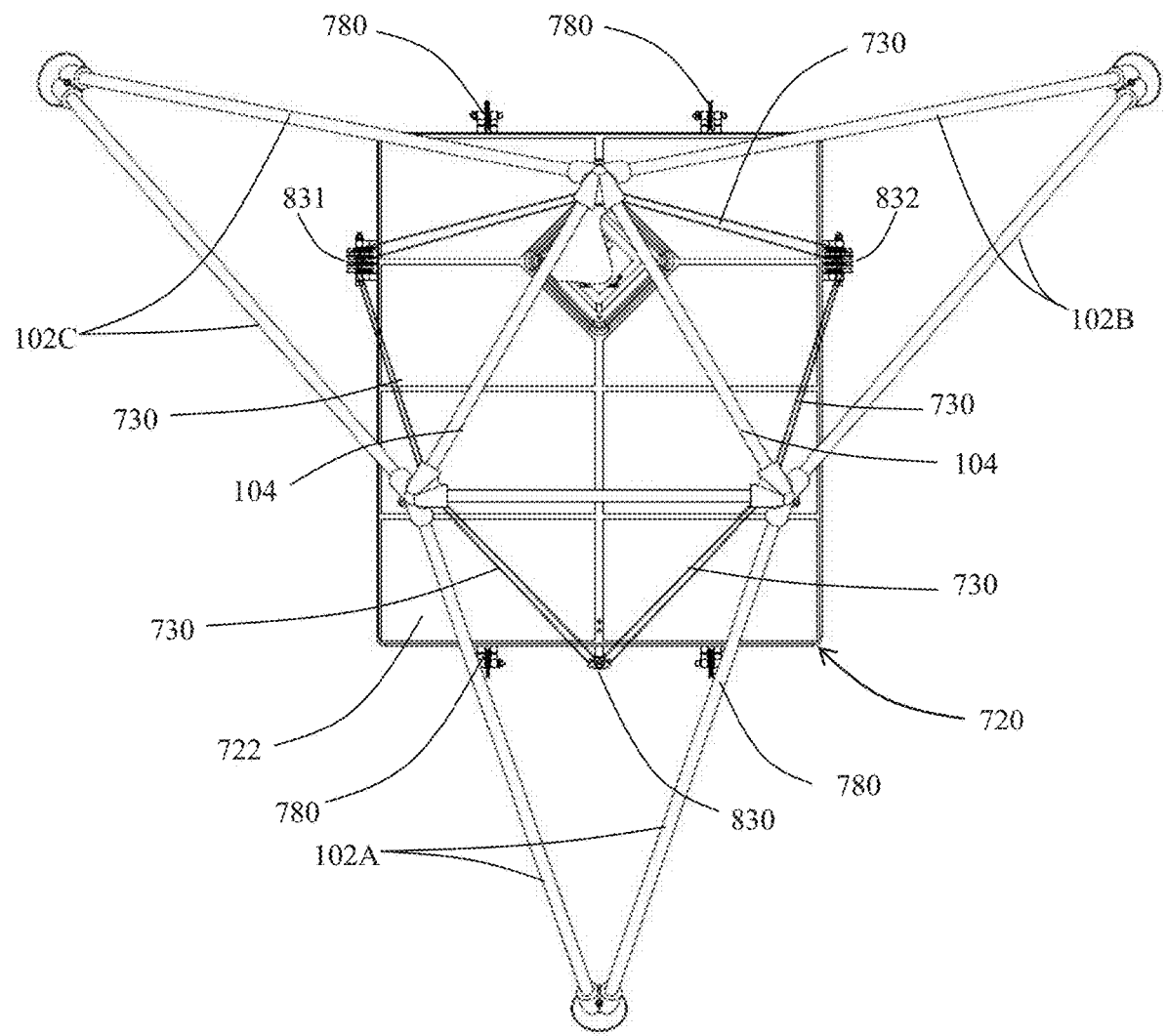
FIG. 11 is a top view of the heliostat, in accordance with the second embodiment.
Figure 12:
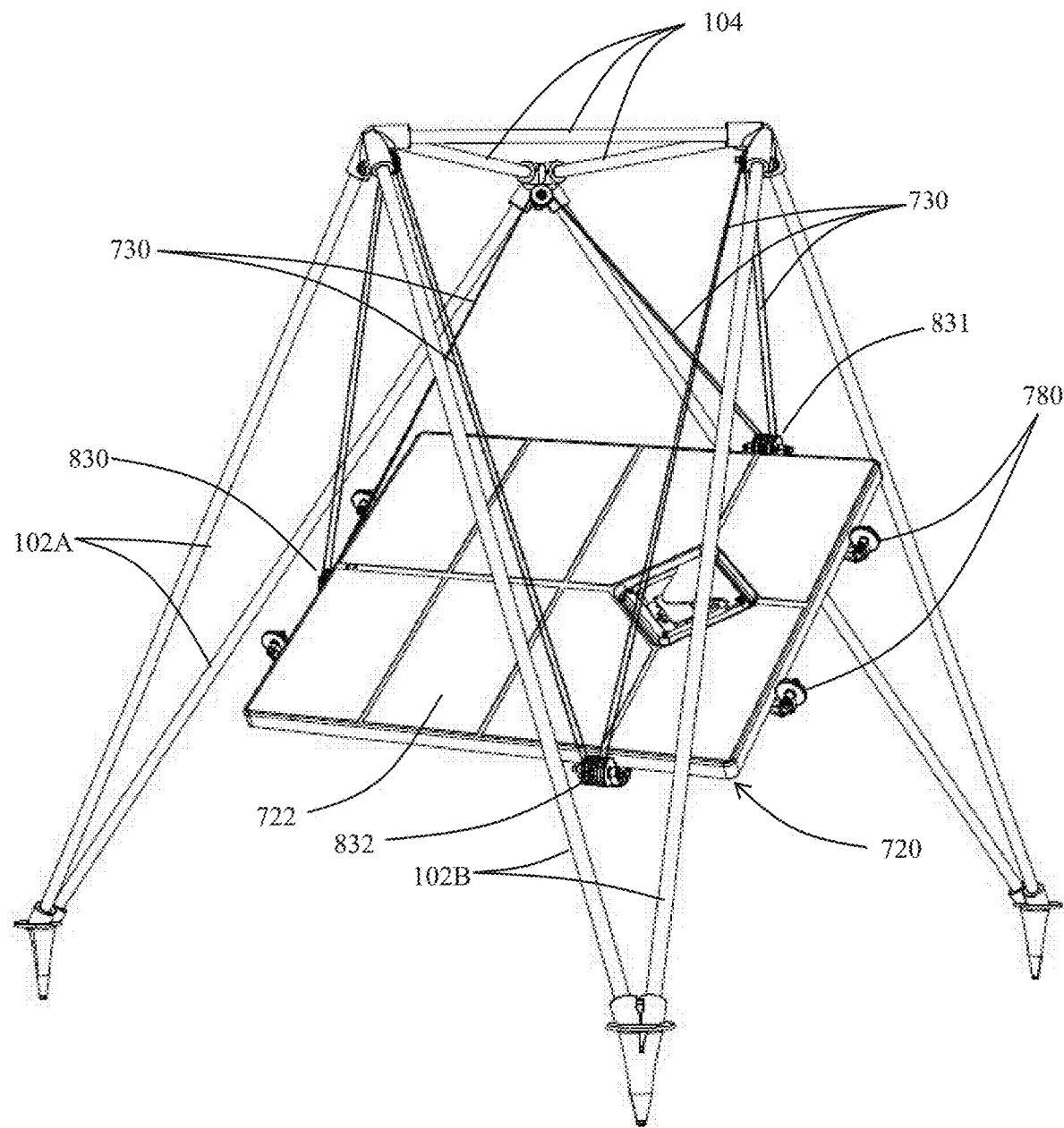
FIG. 12 is a front view of the heliostat, in accordance with the second embodiment.
Figure 13:
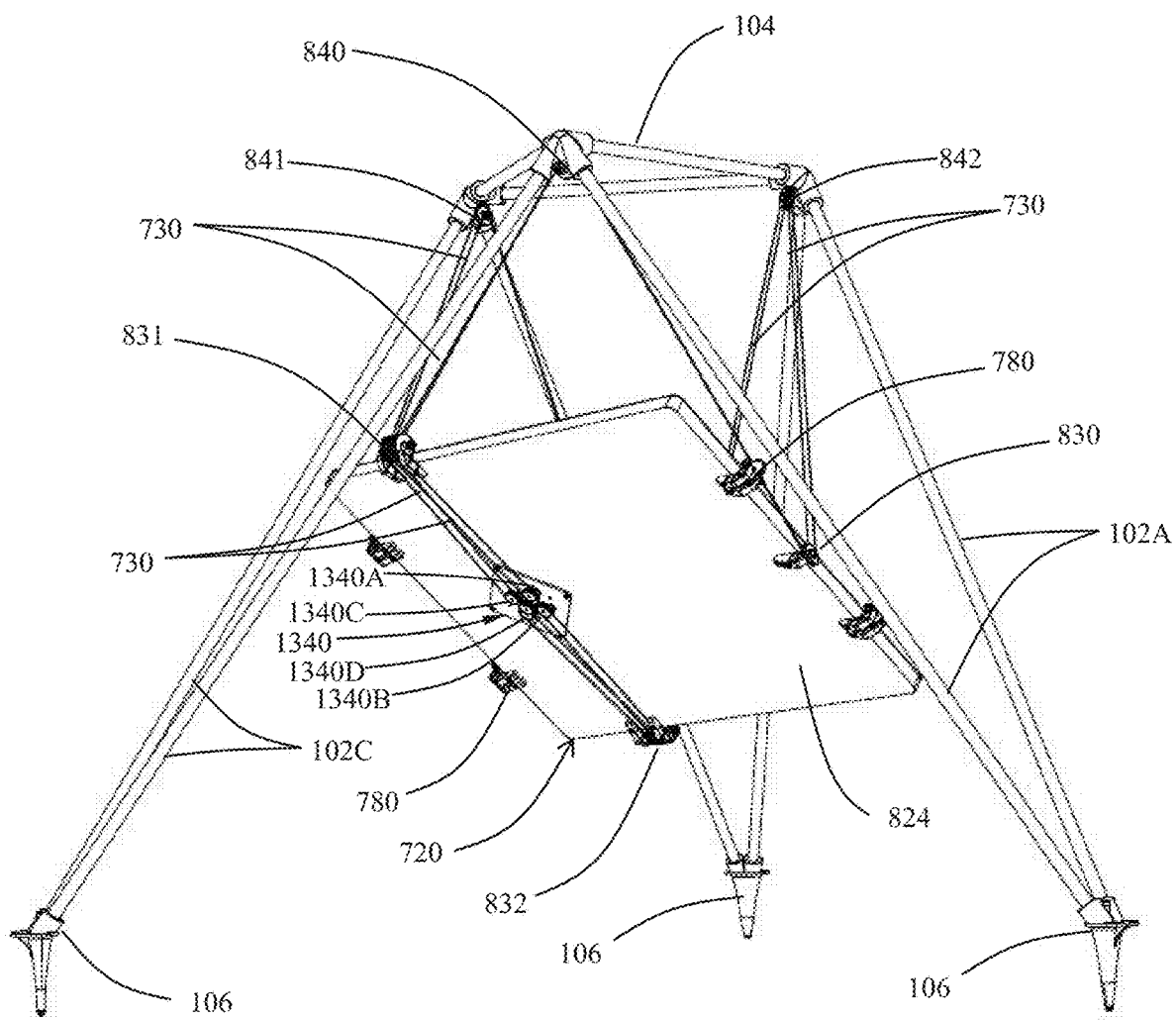
FIG. 13 is a side view of the heliostat, in accordance with the second embodiment.
Figure 14:
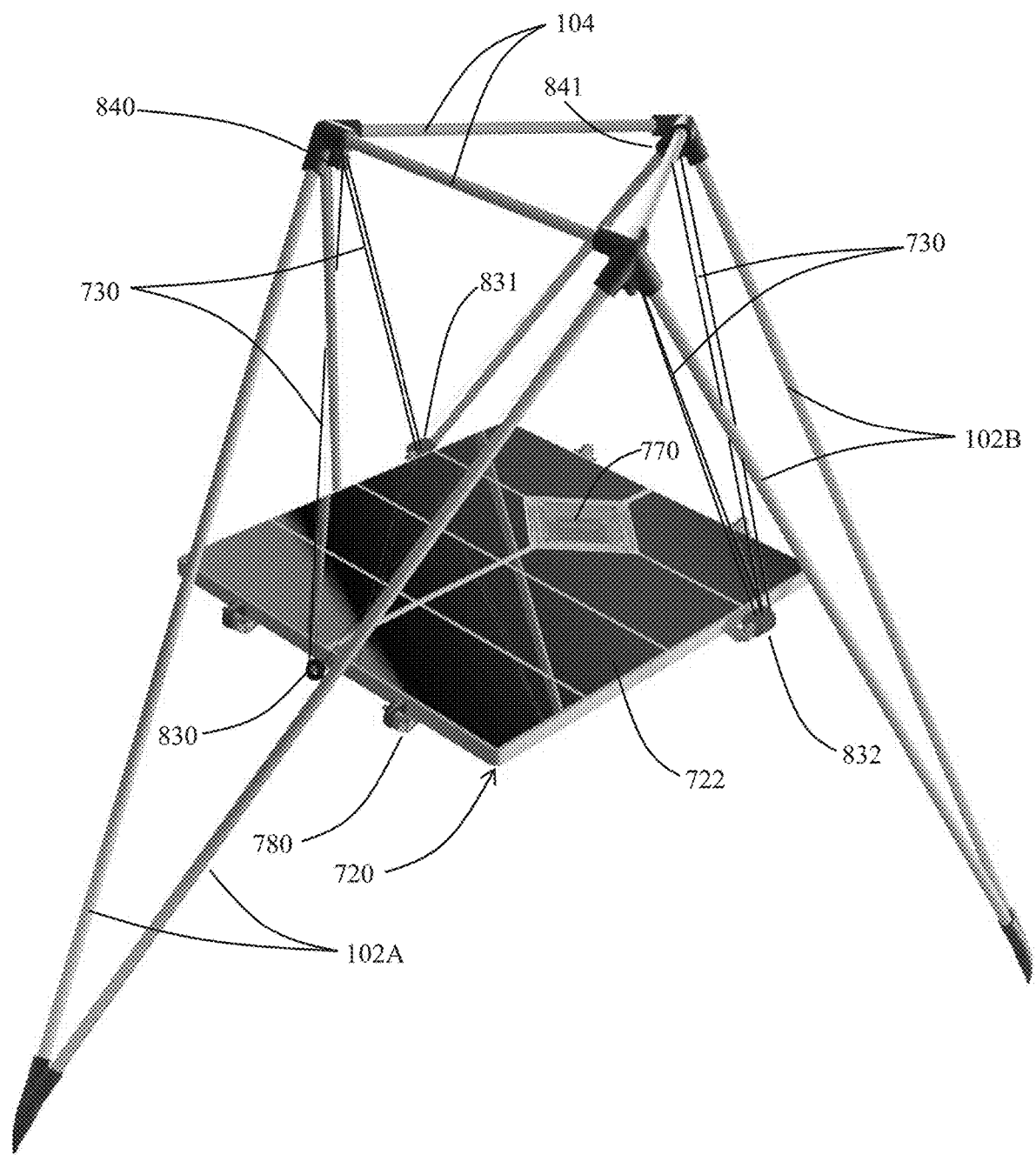
FIG. 14 is a perspective view of the heliostat, in accordance with the second embodiment.

A cross-section of the wire guide 140 is illustrated in FIG. 6. As shown, the wire guide attaches to the underside of the mirror backing 610 and extends outward from the lateral edge of the mirror assembly 120. The wire guide includes a first pair of apertures, 640, 642 in which one of the two wires 630 is seated. The wire guide also includes a second pair of apertures in which a second wire 630, not visible, is seated. In each case, the apertures are larger than the wires, thereby allowing the wires 630 to slide freely through the apertures as the actuators reel in or reel out the wires. The wire guide 140, therefore, serves to effectively change the lateral movement of the wires 630 below the mirror 122 to vertical movement above the mirror 122 as the actuators 520 reel in or reel out the wires 630. In turn, the associated edge of the mirror 122 ascends or descends, respectively. In other embodiments, a wheel or pulley may optionally be used as an alternative to a wire guide 140.

The mirror backing 610 may optionally include concrete or similar strong and dense material. The weight of the concrete advantageously enables the mirror assembly 120 to utilize gravity to resist the force of wind, which would otherwise cause the mirror assembly 120 to swing in the presence of wind and risk damage. As one skilled in the art will appreciate, the placement of the actuators 520 and jack screws 522 on the underside of the mirror assembly 120 advantageously protectively conceal the moving components from adverse weather conditions.

Second Example Heliostat Embodiment

Illustrated in FIGS. 7 through 15 is a second embodiment of an example heliostat 700 with a suspended mirror. The heliostat 700 includes a frame with multiple legs, a mirror assembly, and a plurality of wires or cables to suspend the mirror assembly from the frame. Although the wires inhibit (e.g., prevent) the mirror assembly from moving laterally, the mirror is able to pivot in place under the control of a plurality of actuators that determine the pitch and roll angles of the mirror. The mirror assembly further includes a fluid reservoir and cleaning assembly.

The frame 701 is in the form of a tripod. The tripod frame 701 includes a plurality of legs members 102A, 102B, 102C, each leg member including a footpad 106. The heliostat 700 is self-ballasting so each footpad 106 sits on the ground without any anchors, stakes, bolts, or foundation. The leg members 102A, 102B, 102C are also rigidly affixed to top rails 104 configured in the form of a rigid triangle. The triangles formed by the leg members 102A, 102B, 102C and top rails 104 cooperate to provide stability to the heliostat 700 while resisting movement, flexing, and torque.

The mirror assembly 720 includes a mirror 722, a rigid backing plate 824, a plurality of actuators 1340 (see FIG. 13) located on the underside of the mirror assembly 720, and a photovoltaic cell 770 for powering a tracking controller processor (not shown) and the plurality of actuators 1340. The plurality of actuators 1340 may optionally include stepper motors which, when energized by the tracking controller, determine the orientation of the mirror 722 to reflect sunlight to a receiver tower (not sown), for example.

The mirror 722 may optionally be planar or curved to focus light on a receiver tower (not shown). The backing plate 824 is optionally cast from concrete with weight sufficient to afford high inertia and resist the force of wind. This concrete may optionally be cast with a curvature to which the mirror is affixed, thus forming a concave mirror. Since the coefficient of thermal expansion of concrete and the mirror are relatively close, the curvature of the mirror changes little as the temperature changes.

The mirror assembly 720 is held by a plurality of suspension wires 730 or other flexible members that suspend the mirror assembly 720 from the frame 701. The arrangement of suspension wires 730 are designed to form diagonals that inhibit (e.g., prevent) the mirror assembly 720 from moving laterally or swinging in response to wind or other lateral force. At the same time, the suspension wires 730 are configured to change the orientation of the mirror assembly 720 in response to changes in tension applied to the wires 730 by the actuators 1340.

The wires 730 form loops and the loops are configured to raise one side of the mirror assembly 720 while simultaneously lowering the other side of the mirror assembly 720. When the points of attachment hold the mirror assembly 720 about its center of gravity, the force to lift one side of the mirror assembly 720 is approximately equal to the force of gravity exerted by the other side of the mirror assembly 720 opposite the center of gravity. As such, it takes little power to move the loop and change the orientation of the mirror assembly 720. Thus, inexpensive, low-power stepper motors can advantageously be employed in the heliostat 700 to change the orientation of the mirror assembly 720.

Figure 15A:
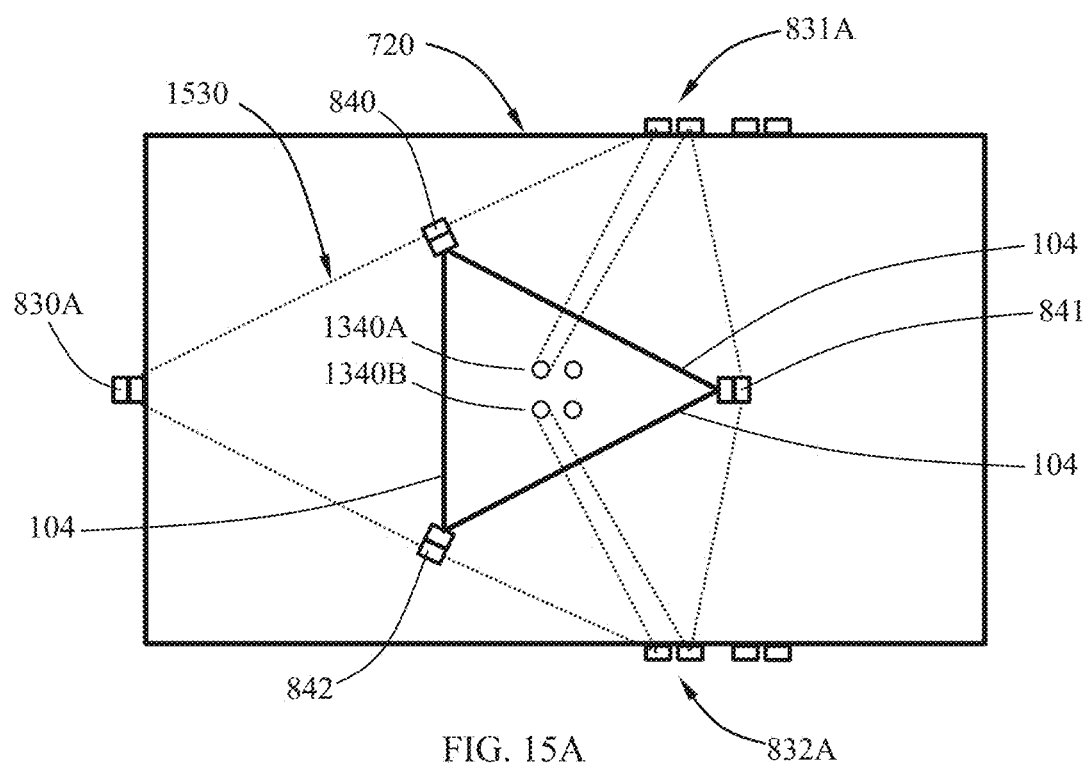
FIGS. 15A and 15B are diagrammatic views of an example control system for changing the mirror pitch angle, in accordance with the second embodiment.
Figure 16A:
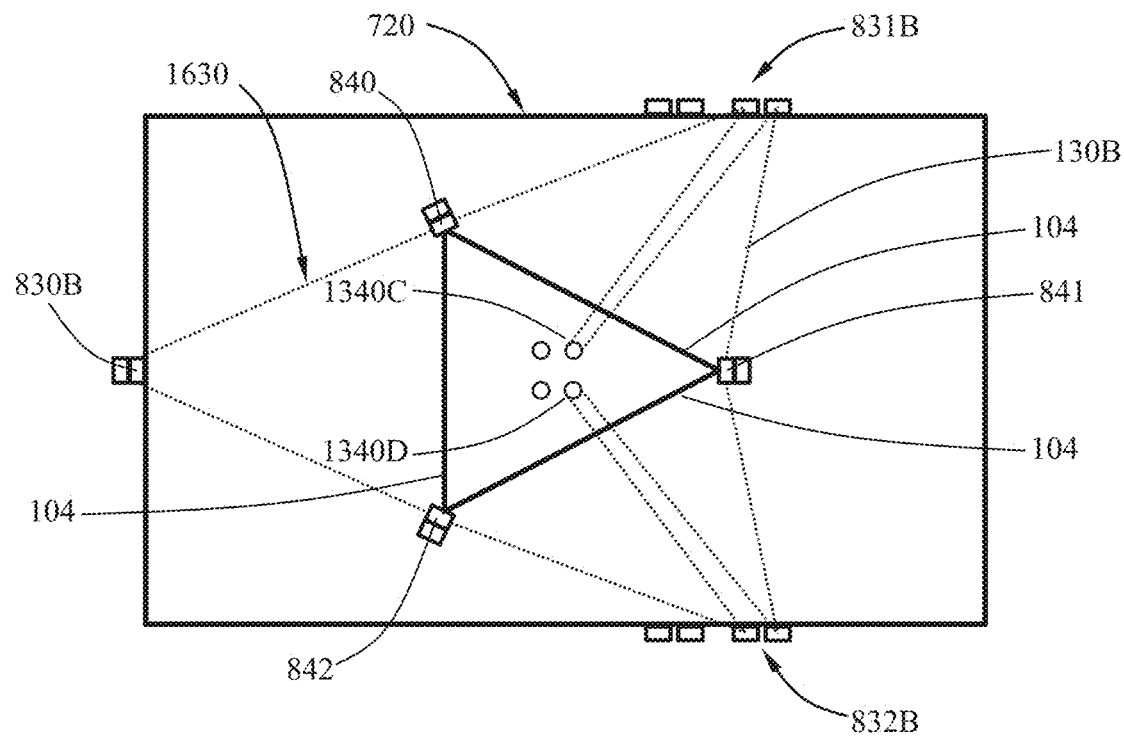
FIGS. 16A and 16B are diagrammatic views of the example control system for changing the mirror roll angle, in accordance with the second embodiment.

As shown in FIGS. 15A and 16A, the set of suspension wires 730 includes a first wire 1530 and a second wire 1630, each in the form of a closed loop. Each of the wire loops is connected to the top rails 104 at three points, connected to the mirror assembly 720 at five points, and coupled to at least one of a plurality of actuators for controlling the orientation of the mirror assembly 822.

With respect to the top rails 104, each of the loops is connected to multiple sets of pulleys 840, 841, 842 affixed to the top rails 104. Each set of pulleys 840, 841, 842 includes either one or two pulleys including one for the first wire loop 1530 and one or two pulleys for the second wire loop 1630. The pulleys for the first 1530 and second wire loops 1630 operate independently from one another. Each individual pulley in the set of pulleys 840, 841, 842, however, is configured to rotate freely in response to changes in tension on the associated wire, thereby maintaining the physical position of the associated wire passing through vertex without altering the tension on the wire.

With respect to the mirror assembly 720, each of the wire loops 1530, 1630 is connect to sets of pulleys 830, 831, 832 affixed to edges of the mirror assembly 720. In particular, the first wire loop 1530 is coupled to one pulley 830A within the first set of pulleys 830, coupled to two pulleys 831A within the second set of pulleys 831, and coupled to two pulleys 832A within the third set of pulleys 832. Similarly, the second wire loop 1630 is coupled to a different one 830B of the pulleys within the first set of pulleys 830, coupled to two other pulleys 831B within the second set of pulleys 831, and coupled to two other pulleys 832B within the third set of pulleys 832. Thus, each of the wire loops is effectively connected to five unique pulleys affixed to the mirror assembly 720.

Each of the wire loops 1530, 1630 is also connected to sets of pulleys coupled to actuators for controlling the orientation of the mirror assembly. In particular, the first wire loop 1530 is coupled a first actuator by means of driver pulleys 1340A, 1340B. The second wire loop 1630 is coupled a second actuator by means of driver pulleys 1340C, 1340D.

Figure 15B:
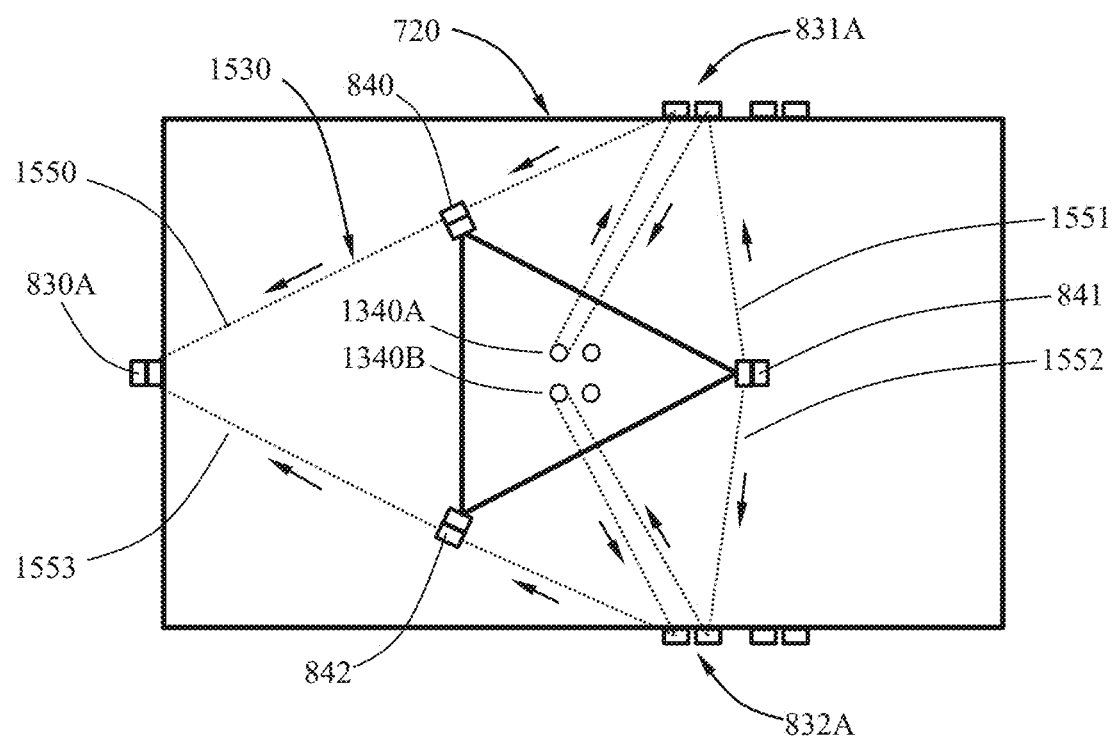

Illustrated in FIGS. 15A and 15B is a diagrammatic representation of the first wire loop 1530 connected to the top rail pulleys, mirror assembly pulleys, and driver pulleys. For purpose of illustration, the top rail and pulleys, mirror assembly and pulleys, and driver pulleys are shown in superposition as viewed from the top down.

Referring to FIGS. 15A and 15B, the first wire loop 1530 is connected to the front edge (left in illustration) of the mirror assembly via a pulley 830A affixed to the mirror assembly 720, to the left edge (top in illustration) of the mirror assembly via two pulleys 831A of the set of pulleys 831, and to the right edge (bottom in illustration) of the mirror assembly via two pulleys 832A of the set of pulleys 832. On the mirror assembly, the first wire loop 1530 is connected to two pulleys 1340A, 1340B of the set of pulleys 1340 on the underside of the mirror backing 824. On the top rails 104, the first wire loop 1530 is connected to one pulley of each pair of pulleys 840, 841, 842.

Referring to FIG. 15B, an actuator controlling the pitch angle drives the first wire loop 1530 to change the orientation of the mirror assembly from front (left in illustration) to back (right in illustration). To lower the front end of the mirror assembly, for example, the tracking controller energizes a stepper motor to turn pulley 1340A clockwise, and turn pulley 1340B counter clockwise. This effectively reels in wire away from top rail pulley 841 and reels out wire toward mirror assembly pulley 830A. That is, the length of wire on the front side of the mirror—segments 1550, 1553—increase while the length of wire on the back side of the mirror—segments 1551, 1552—decrease. As a result, the front side of the mirror assembly with pulley 830A dips down while the rear side of the mirror assembly proximate to pulley 841 lifts up. This represents an increase in pitch angle. The pitch angle may be reduced or reversed by reversing the direction of rotation of the pulleys 1340A, 1340B described above.

Figure 16B:
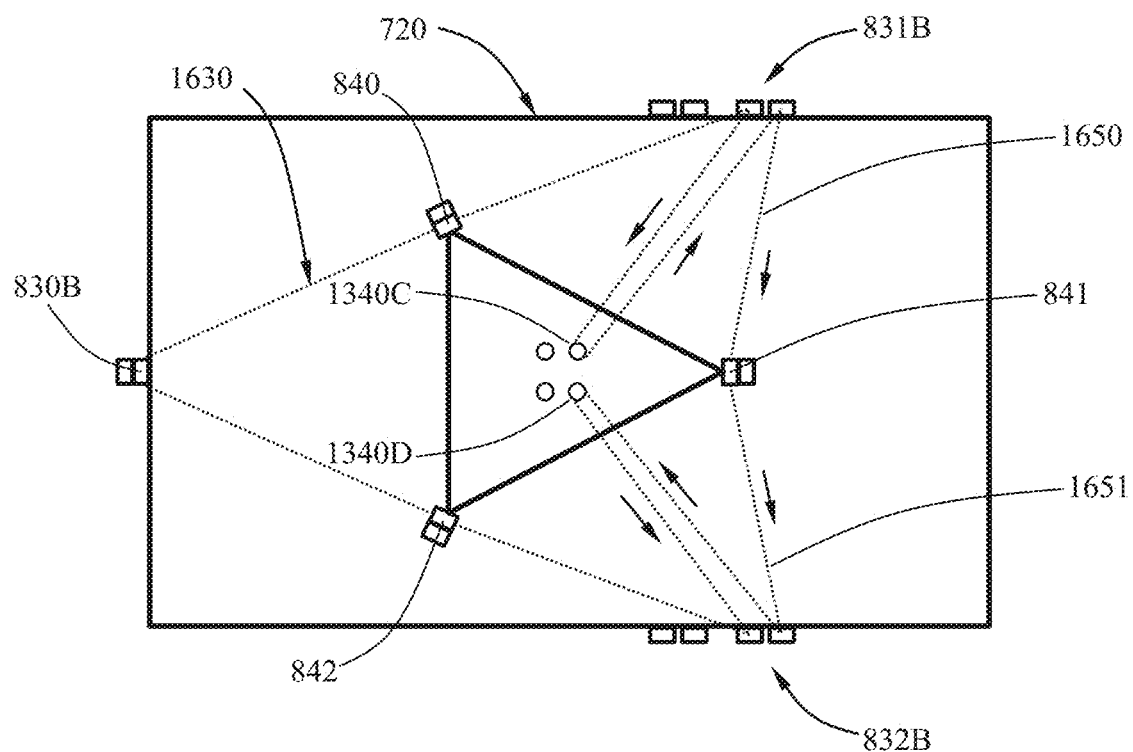

Illustrated in FIGS. 16A and 16B is a diagrammatic representation of the second wire loop 1630 connected to the top rail pulleys, mirror assembly pulleys, and driver pulleys. For purpose of illustration, the top rail 104 with pulleys, mirror assembly with pulleys, and driver pulleys are shown in superposition as viewed from the top down.

As illustrated in FIG. 16A, the second wire loop 1630, which operates independent of first loop 1530, is connected to the front (left in illustration) of the mirror assembly via a pulley 830B affixed to the mirror assembly 720, to the left side (top in illustration) of the mirror assembly via two pulleys 831B of the set of pulleys 831, and to the right side (bottom in illustration) of the mirror assembly via two pulleys 832B of the set of pulleys 832. On the top rails 104, the second wire loop 1630 is connected to one pulley of each pair of pulleys 840, 841, 842. On the mirror assembly, the second wire loop 1630 is connected to two pulleys 1340C, 1340D of the set of pulleys 1340 on the underside of the mirror backing 824.

Referring to FIG. 16B, an actuator controlling the roll angle drives the second wire loop 1630 to change the orientation of the mirror assembly from left to right. To raise the left side (top in illustration) and lower the right side (bottom in illustration) of the mirror assembly, for example, the tracking controller energizes a stepper motor to turn pulleys 1340C, 1340D counter clockwise. This effectively reels in wire away from mirror assembly pulleys 831B and reels out wire toward mirror assembly pulleys 832B. That is, the length of wire on the left side of the mirror—segment 1650—decreases while the length of wire on the right side of the mirror—segment 1651—increases. As a result, the left side of the mirror assembly 720 rises while the right side of the mirror assembly 720 drops. This represents a change in roll angle. The roll angle may be changed in the opposite direction by driving pulleys 1340C, 1340D in the clockwise direction.

The mirror 722 is configured to rotate approximately 75 degrees from the horizontal plane in any direction, the mirror 722 is approximately one meter in length, and the backing plate 824 weighs approximately 100 kilograms in order to hold the heliostat to the ground in a self-ballasting manner with no physical attachments. The suspension wires 730 may optionally be made of braided wire, cables, rope, or nylon, for example.

Figure 17:
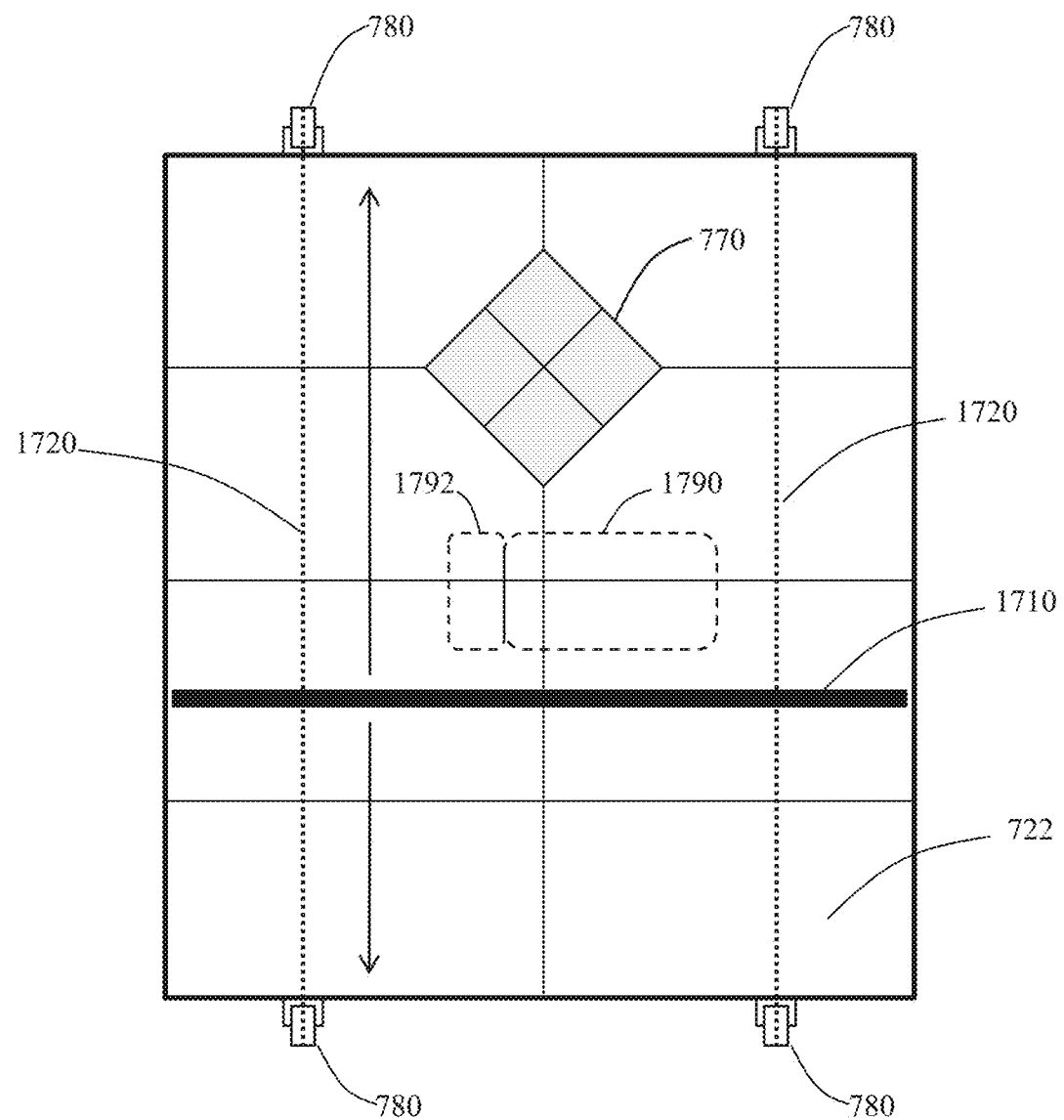
FIG. 17 is a top view of the heliostat with an example cleaning assembly, in accordance with the second embodiment.

As illustrated in FIG. 17, the mirror assembly 720 in some embodiments optionally further includes a cleaning assembly to enable the heliostat 700 to clean its own mirror or PV panel. The cleaning assembly includes a wiper blade 1710 configured to traverse the mirror 722 and remove dust and debris. In particular, the wiper blade is driven by a cleaning motor (not shown) via cables 1720 mounted to pulleys 780 at opposite ends of the mirror assembly 720. To initiate a cleaning operation, the cleaning motor is activated and the wiper blade 1710 pulled across the mirror assembly 720.

In some embodiments, the PV cell 770 is recessed below the surface of the mirror 722, and the mirror 722 curved in a concave manner. When oriented substantially horizontal, rain water is then funneled inward by the mirror's curvature and captured in a recess above the PV cell 770. In this embodiment, the mirror assembly 720 further includes an internal reservoir 1790 and pump 1792 to spray the captured water onto the mirror/panel surface 722 before the wiper blade 1710 is swept across the surface, thereby increasing the cleaning power of the mirror assembly.

In some embodiments, the photovoltaic (PV) cell 770 enables the heliostat 700 to be self-powered without any external source of power. When the mirror 722 needs to be reoriented, for example, power from the PV cell 770 may optionally be used to energize one or more motors for adjusting the pitch and/or roll angles of the mirror assembly 720.

Third Example Heliostat Embodiment

Figure 18:
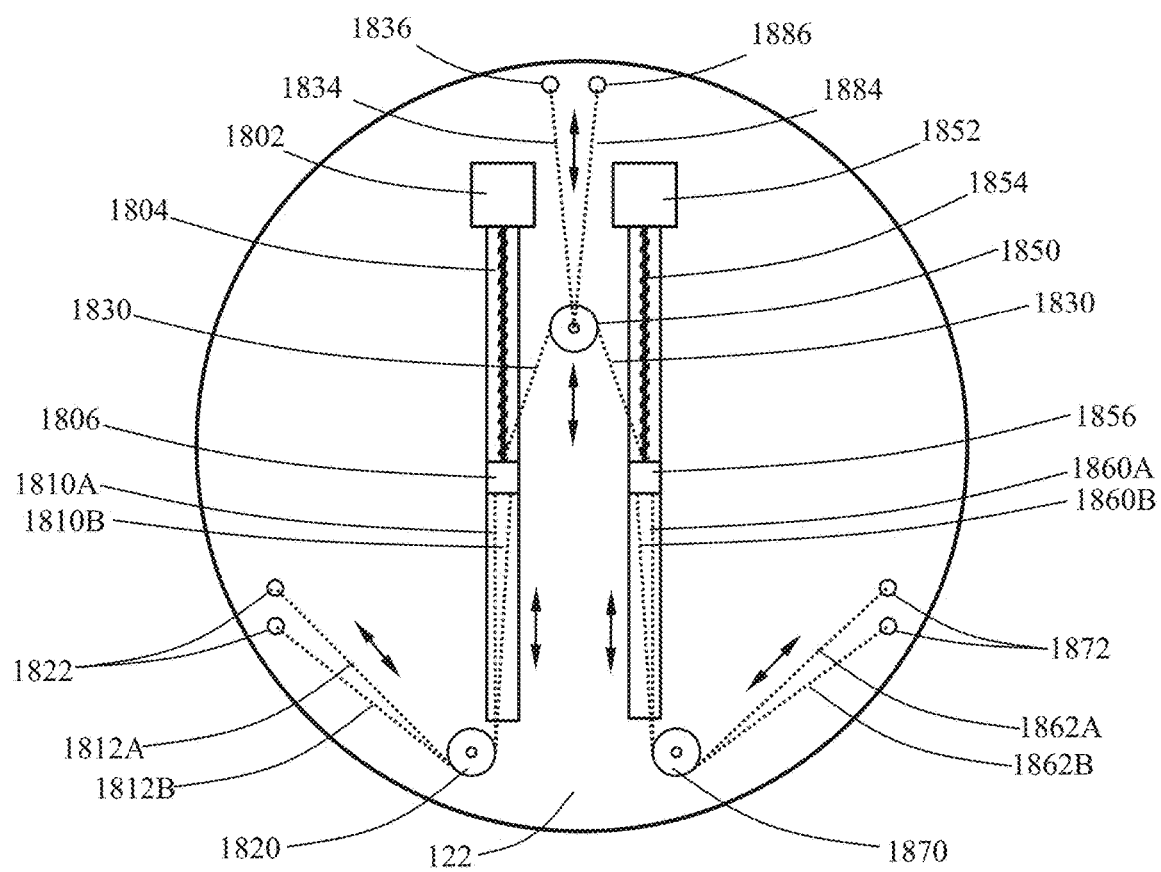
FIGS. 18 and 19 are diagrammatic views of the example control system for changing the mirror orientation, in accordance with a third embodiment.
Figure 19:
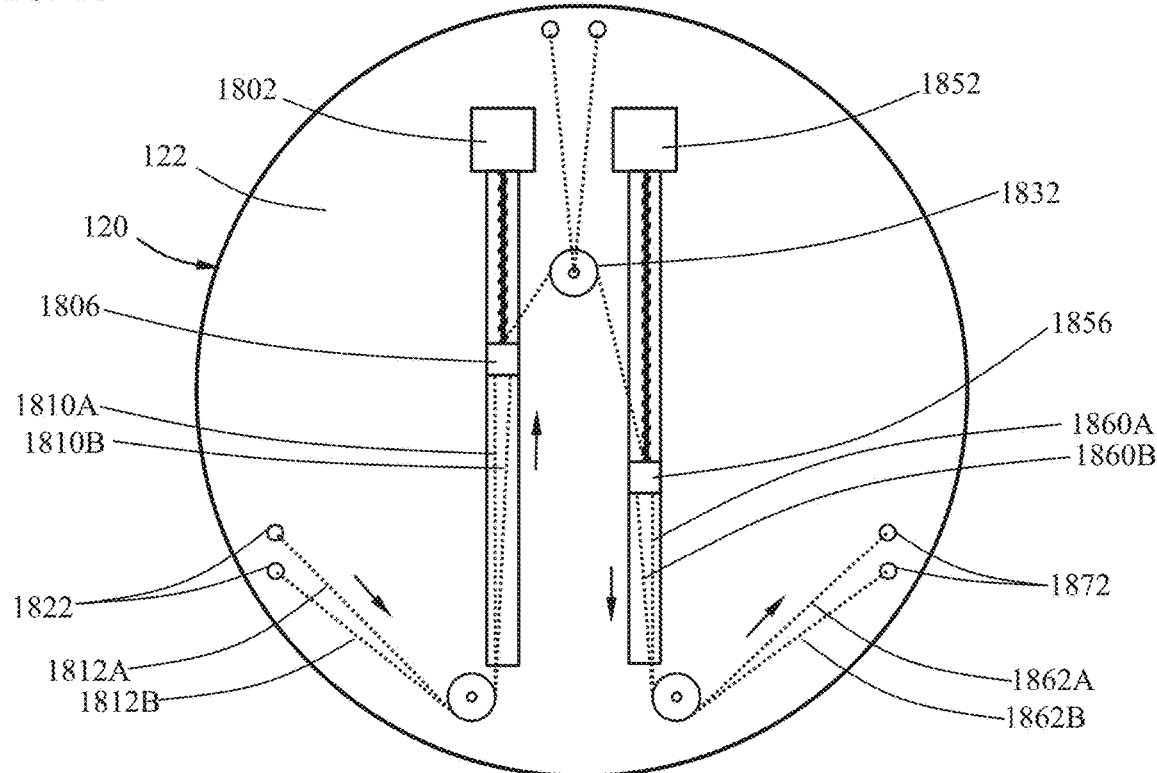

FIGS. 18-19 show the underside of an optical assembly 120 and a third example embodiment of a control mechanism for suspending and orienting the optical assembly with respect to the frame. In this embodiment, the optical assembly is suspended by a plurality of wires—including wire segments 1810A, 1810B, 1812A, 1812B, 1834, 1860A, 1860B, 1862A, 1862B, 1884—that run under the optical assembly to points of attachment on the frame. The pitch and roll angles of the optical assembly are controlled by means of only two stepper motors—i.e., first stepper motor 1802 and second stepper motor 1852—mounted on the underside 122 of the optical assembly. Each of the two motors, in turn, is coupled to a jack screw 1804, 1854 with a carrier square nut 1806, 1856. When a stepper motor turns, the rotation of the jack screw causes the associated square nut to slide linearly up or town within a channel or track.

Two wires 1810A, 1810B are affixed to the first square nut 1806 and contact a pulley 1820. The section 1812A of the wire 1810A and section 1812B of the wire 1810B pass through wire guides, i.e., apertures 1822, to the upper side of the optical assembly where they are affixed to two vertices on a top rail 104. Similarly, two wires 1860A, 1860B are affixed to the second square nut 1856 and engage a pulley 1870. The section 1862A of the wire 1860A and section 1862B of the wire 1860B pass through wire guides, i.e., apertures 1872, to the upper side of the optical assembly and where they are affixed to two vertices on the top rail.

An additional wire 1830 is also affixed to both the first and second square nuts 1806, 1856 and to a third pulley 1850 constrained to move in a line coinciding with the vertically direction in FIGS. 18-19. The pulley 1850 is free to rotate as the wire 1830 moves in response to tension induced by first and second square nuts 1806, 1856. Two additional wires 1834, 1884 are affixed to the center of the pulley 1850, and therefore move up or down with the pulley. The wires 1834, 1884 pass through apertures 1836, 1886, respectively, come out the top side of the optical assembly, and then attach to vertices on a frame top rail 104.

In operation, the two stepper motors 1802, 1852 are configured to change the pitch and roll angle of the optical assembly. To change the pitch, for example, stepper motors 1802, 1852 move square nuts 1806, 1856 in unison. To lower the top end of the optical assembly, for example, both square nuts 1806, 1856 are moved toward the stepper motors 1802, 1852 (upward in illustration), which causes the pulley 1850 to move upward and the wires 1834, 1884 to also move upward. Thus, the length of wire between the apertures 1836, 1886 in the optical assembly and the top rail 104 increases. At the same time, the length of wire between the apertures 1822, 1872 and the top rail 104 decreases.

To raise the top end of the optical assembly 120, both square nuts 1806, 1856 are moved downward, which causes the pulley 1850 to move downward and the wires 1834, 1884 to also move downward. Thus, the length of wire between the top edge, i.e., apertures 1836, 1886, and the top rail 104 decreases. At the same time, the length of wire between the bottom edge, i.e., apertures 1822, 1872, of the optical assembly and the top rail 104 increases.

To change the roll angle of the optical assembly 120, for example, the two stepper motors 1802, 1852 move square nuts 1806, 1856 in opposite directions. As illustrated in FIG. 19, the two stepper motors 1802, 1852 cause the first square nut 1806 to move upward to reel in wires 1812A, 1812B through apertures 1822 while the second square nut 1856 moves downward to reel out wires 1862A, 1862B through apertures 1872. Thus, the left side of the optical assembly rises while the right side is lowered, thus changing the angle of the mirror in the lateral direction with respect to an axis running vertically through optical assembly shown in the FIG. 19.

Fourth Example Heliostat Embodiment

Figure 20:
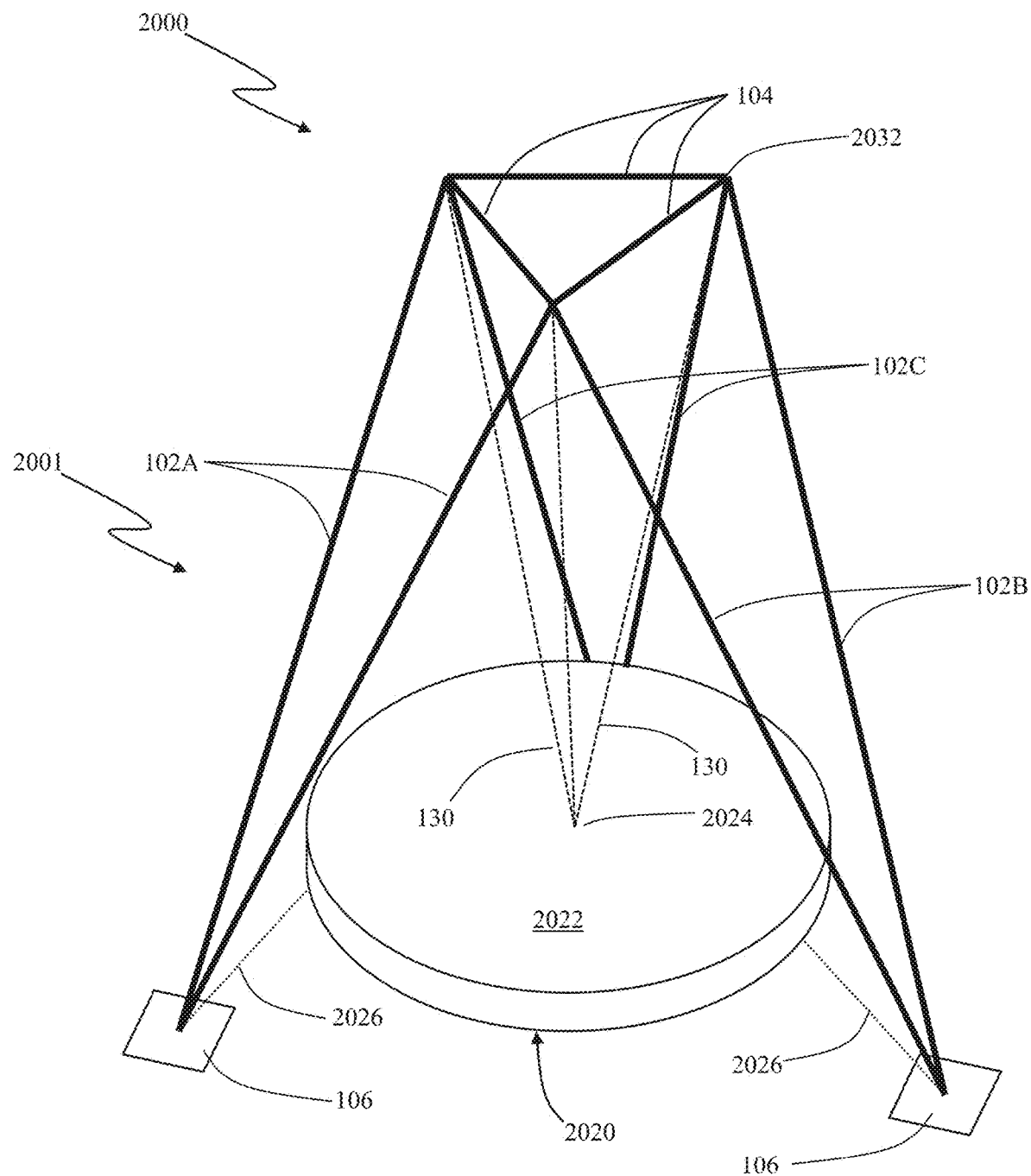
FIG. 20 is a perspective view of the example heliostat, in accordance with a fourth embodiment.
Figure 21:
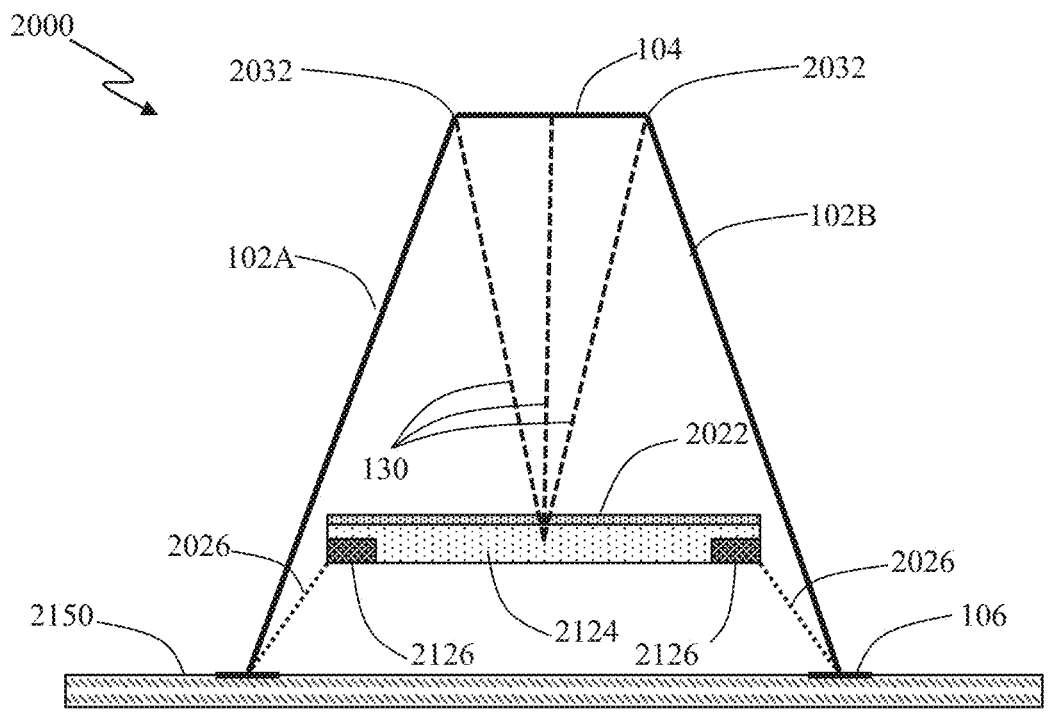
FIG. 21 is a side view of the heliostat, in accordance with the fourth embodiment.
Figure 22:
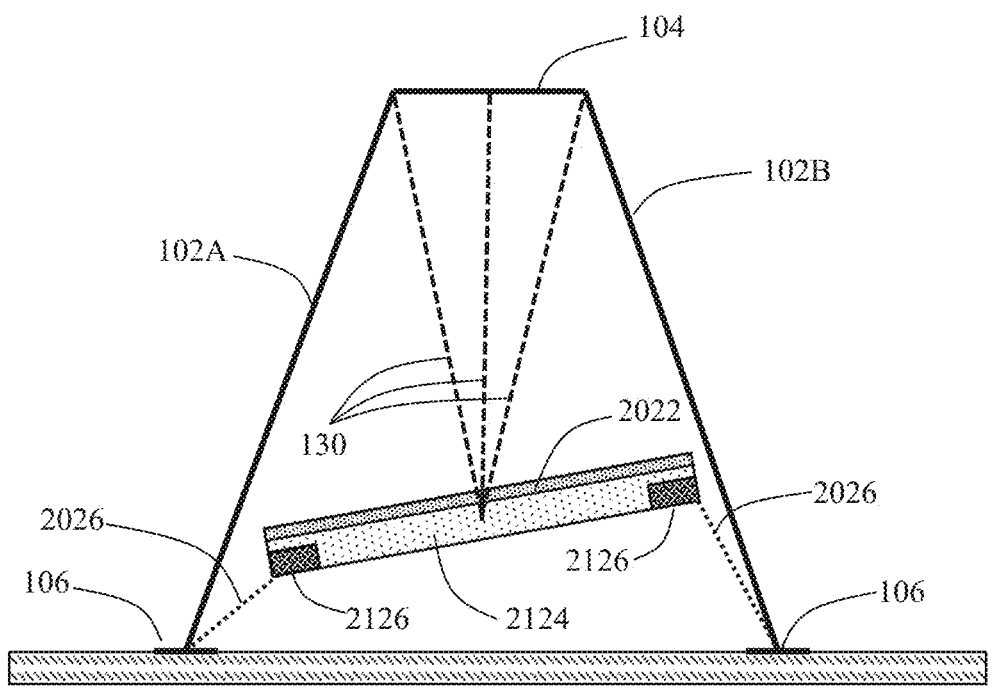
FIG. 22 is a side view of the heliostat, in accordance with the fourth embodiment.

Illustrated in FIGS. 20-22 is a fourth embodiment of an example heliostat 2000 with a suspended mirror. The heliostat 2000 includes a frame 2001 with multiple legs, a mirror assembly, and a plurality of wires to suspend the mirror assembly from the frame 2001. Although the wires prevent the mirror assembly from moving laterally, the mirror is able to pivot in place under the control of a plurality of actuators that determine the pitch and roll angles of the mirror.

In the fourth example embodiment, the frame 2001 includes a plurality of leg members 102A, 102B, 102C and footpads 106. The leg members 102A, 102B, 102C are also rigidly affixed to rigid top rails 104 configured in the form of a triangle. The triangles formed by the rigid members 102A, 102B, 102C and top rails 104 provide stability while resisting movement, flexing, and torque with respect to the ground, roof, or other mounting surface 2150.

The heliostat 2000 includes at least one suspension wire 130 or other flexible members, each wire affixed at a vertex 2032 of the triangle formed by rigid members 104. The other end of each of the plurality of wires 130 is attached to a pivot point on the mirror assembly 2020. The mirror assembly 2020 may rotate about the pivot point 2024 to change elevation angle, but the arrangement of wires is configured to inhibit (e.g., prevent) the mirror assembly 2020 from moving laterally in a swinging motion.

The pivot point 2024 substantially coincides vertically with the center of gravity of the mirror assembly 2020, or resides within several centimeters of the center of gravity. This enables the mirror assembly 2020 to be rotated about the pivot point 2024 with a very small amount of force, thereby advantageously permitting the use of small and inexpensive actuators.

The mirror assembling 2020 includes a mirror 2022, a rigid backing plate 2124, and a plurality of actuators 2126. The mirror 2022 may optionally be planar or curved to focus light on a receiver tower (not shown). The backing plate 2124 is optionally cast from concrete which possesses weight and exhibits high inertia to resist the force of wind. This concrete may optionally be cast with a curvature to which the mirror is affixed and a concave mirror formed.

The plurality of actuators 2126 are optionally stepper motors for controlling the orientation of the mirror 2022, but may also be based on any number of electric, pneumatic, or hydraulic actuators. Each actuator 2126 is, for example, coupled to a steering wire 2026 affixed to a rigid member 102A, 102B, 102C. The three actuators 2126 may then cooperate to pull down one edge of the mirror assembly 120 and direct reflected light to the receiver tower (not shown).

To change the elevation angle, as shown in FIG. 22, the left actuator 2126 reels in the steering wire 2026 to pull down the left side of the mirror assembly while the right actuator 2126 unreels. In the example embodiment, the three steering wires 2026 are kept relatively taut, independent of the mirror orientation, to prevent the mirror assembly 2020 from moving in response to wind, for example. The stepper motors 2126 are, in turn, energized by a tracking controller (not shown) based on the position of the sun and receiver tower (not shown).

The mirror assembly 2020 is configured to rotate approximately 75 degrees from the horizontal plane in any direction, the mirror 2022 is approximately one meter in diameter, and the backing plate 1214 weighs approximately 100 kilograms in order to hold the heliostat to the ground in a self-ballasting manner with no physical attachments. The suspension wires 130 and steering wire 2026 may optionally be made of braided wire, cables, rope, or nylon, for example.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuits (ASIC), and digital/analog circuits with discrete components, for example.

Although the description above contains many specifications, these should not be construed as limiting the scope of the invention but as merely providing illustrations of some example embodiments of this invention.

Additional Embodiments

In embodiments of the present invention, a heliostat, and method of making the same, may be in accordance with any of the following clauses:

Clause 1. A heliostat for tracking the sun, the heliostat comprising:

a frame comprising a plurality of leg members;

an optical assembly configured to hang from the frame between the leg members of the frame, wherein the optical assembly comprises concrete;
a plurality of wires configured to connect the optical assembly to the frame; and
a plurality of actuators configured to change the orientation of the optical assembly via the plurality of wires.

Clause 2. The heliostat in clause 1, wherein the optical assembly further comprises a mirror or photovoltaic panel.

Clause 3. The heliostat in any preceding clause, wherein the frame comprises a horizontal top rail and a three leg members.

Clause 4. The heliostat in clause 3, wherein each of the three leg members comprises a footing, whereby the heliostat rests on a mounting surface without attaching to the mounting surface.

Clause 5. The heliostat in any preceding clause, wherein the plurality of wires are configured to suspend the optical assembly from the frame.

Clause 6. The heliostat in any preceding clause, wherein the plurality of wires are connected to the center of the optical assembly.

Clause 7. The heliostat in any preceding clause, wherein the plurality of actuators are mounted at the underside of the optical assembly.

Clause 8. The heliostat in any preceding clause, wherein the plurality of actuators are configured to reel in and reel out the plurality of wires via at least one wire guide in the optical assembly.

Clause 9. The heliostat in any preceding clause, wherein first actuator of the plurality of actuators is configured to rotate the optical assembly about a first horizontal axis, and a second actuator of the plurality of actuators is configured to rotate the optical assembly about a second horizontal axis perpendicular to the first horizontal axis.

Clause 10. The heliostat in any preceding clause, wherein the optical assembly further comprises a tracking controller to energize the plurality of actuators.

Clause 11. The heliostat in clause 10, wherein the optical assembly further comprises a photovoltaic panel configured to power the tracking controller and plurality of actuators.

Clause 12. The heliostat in any preceding clause, wherein the optical assembly further comprises a cleaning assembly.

Clause 13. The heliostat in clause 12, wherein the cleaning assembly comprises a wiper blade configured to wipe debris from the optical assembly.

Clause 14. The heliostat in any of clauses 12-13, wherein the optical assembly comprises a reservoir for capturing water on the optical assembly, and the cleaning assembly comprises a pump for spraying the captured water on the optical assembly.

Clause 15. The heliostat in any preceding clause, wherein the optical assembly further comprises tracking controller and a camera for capturing images of the frame.

Clause 16. The heliostat in clause 15, wherein the tracking controller is configured to determine the orientation of the optical assembly from the images, and aim the optical assembly based on the images.

Clause 17. A heliostat comprising:
a tripod frame;
an optical assembly suspended from the tripod frame, wherein the optical assembly is configured to rotate relative to the tripod frame;
a plurality of actuators configured to change the orientation of the optical assembly to track the sun.

Clause 18. The heliostat in clause 17, wherein the optical comprises concrete.

Clause 19. The heliostat in any of clauses 17-18, wherein the plurality of actuators are mounted at the underside of the optical assembly.

Clause 20. The heliostat in any of clauses 17-19, wherein the optical assembly further comprises a tracking controller and photovoltaic panel configured to power the tracking controller and plurality of actuators.

While certain embodiments of the invention have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present invention is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the heliostat need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form variations of the discussed heliostat.

We claim:

1. A heliostat for tracking the sun, the heliostat comprising:
   a frame comprising a plurality of leg members;
   an optical assembly configured to hang from the frame between the leg members of the frame, wherein the optical assembly comprises concrete;
   a plurality of wires configured to connect the optical assembly to the frame and to suspend the optical assembly from the frame; and
   a plurality of actuators configured to change the orientation of the optical assembly via the plurality of wires, the plurality of actuators configured to reel in and reel out the plurality of wires via at least one wire guide in the optical assembly, wherein first actuator of the plurality of actuators is configured to rotate the optical assembly about a first horizontal axis, and a second actuator of the plurality of actuators is configured to rotate the optical assembly about a second horizontal axis perpendicular to the first horizontal axis.

2. The heliostat in claim 1, wherein the optical assembly further comprises a mirror or photovoltaic panel.

3. The heliostat in claim 1, wherein the frame comprises a horizontal top rail and three leg members.

4. The heliostat in claim 3, wherein each of the three leg members comprises a footing, whereby the heliostat rests on a mounting surface without attaching to the mounting surface.

5. The heliostat in claim 1, wherein the plurality of wires are connected to the center of the optical assembly.

6. The heliostat in claim 1, wherein the plurality of actuators are mounted at the underside of the optical assembly.

7. The heliostat in claim 1, wherein the optical assembly further comprises a tracking controller to energize the plurality of actuators.

8. The heliostat in claim 7, wherein the optical assembly further comprises a photovoltaic panel configured to power the tracking controller and plurality of actuators.

9. The heliostat in claim 1, wherein the optical assembly further comprises a cleaning assembly.

10. The heliostat in claim 9, wherein the cleaning assembly comprises a wiper blade configured to wipe debris from the optical assembly.

11. The heliostat in claim 10, wherein the optical assembly comprises a reservoir for capturing water on the optical assembly, and the cleaning assembly comprises a pump for spraying the captured water on the optical assembly.

12. The heliostat in claim 1, wherein the optical assembly further comprises tracking controller and a camera for capturing images of the frame.

13. The heliostat in claim 12, wherein the tracking controller is configured to determine the orientation of the optical assembly from the images, and aim the optical assembly based on the images.

14. A heliostat comprising:
   a tripod frame;
   an optical assembly suspended from the tripod frame by a plurality of wires connected to the frame, wherein the optical assembly is configured to rotate relative to the tripod frame;
   a plurality of actuators configured to change the orientation of the optical assembly to track the sun, the plurality of actuators configured to reel in and reel out the plurality of wires via at least one wire guide in the optical assembly, wherein first actuator of the plurality of actuators is configured to rotate the optical assembly about a first horizontal axis, and a second actuator of the plurality of actuators is configured to rotate the optical assembly about a second horizontal axis perpendicular to the first horizontal axis.

15. The heliostat in claim 14, wherein the optical comprises concrete.

16. The heliostat in claim 14, wherein the plurality of actuators are mounted at the underside of the optical assembly.

17. The heliostat in claim 14, wherein the optical assembly further comprises a tracking controller and photovoltaic panel configured to power the tracking controller and plurality of actuators.

* * * * *